(12) United States Patent
Kaneko et al.

(10) Patent No.: US 12,136,438 B2
(45) Date of Patent: *Nov. 5, 2024

(54) MAGNETIC TAPE CARTRIDGE, MAGNETIC TAPE DRIVE, MAGNETIC TAPE SYSTEM, AND METHOD OF OPERATING MAGNETIC TAPE DRIVE

(71) Applicant: FUJIFILM CORPORATION, Tokyo (JP)

(72) Inventors: Yusuke Kaneko, Kanagawa (JP); Toru Nakao, Kanagawa (JP); Atsushi Musha, Kanagawa (JP); Norihito Kasada, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,418

(22) Filed: May 19, 2023

(65) Prior Publication Data
US 2023/0290379 A1    Sep. 14, 2023

Related U.S. Application Data

(62) Division of application No. 17/591,593, filed on Feb. 2, 2022, now Pat. No. 11,705,159.

(30) Foreign Application Priority Data

Feb. 5, 2021 (JP) .................... 2021-017747

(51) Int. Cl.
G11B 23/04 (2006.01)
G11B 15/06 (2006.01)
G11B 15/43 (2006.01)

(52) U.S. Cl.
CPC ........... *G11B 23/042* (2013.01); *G11B 15/06* (2013.01); *G11B 15/43* (2013.01)

(58) Field of Classification Search
None
See application file for complete search history.

(56) References Cited

U.S. PATENT DOCUMENTS

| 6,005,735 A | 12/1999 | Gleim et al. |
| 6,788,486 B1 | 9/2004 | Sakai |

(Continued)

FOREIGN PATENT DOCUMENTS

| JP | H05-282755 A | 10/1993 |
| JP | H05-290445 A | 11/1993 |

(Continued)

OTHER PUBLICATIONS

Restriction requirement issued by USPTO on Oct. 17, 2022, in related U.S. Appl. No. 17/591,593.

(Continued)

*Primary Examiner* — William J Klimowicz
(74) *Attorney, Agent, or Firm* — SOLARIS Intellectual Property Group, PLLC

(57) ABSTRACT

A magnetic tape cartridge includes a case in which a magnetic tape is housed, and an NVM of a cartridge memory provided in the case. The NVM stores cartridge information including an identification ID regarding an allowable range of temperature/humidity in using the magnetic tape, an upper limit of a preservation period of the magnetic tape, and an upper limit of a use frequency of the magnetic tape.

9 Claims, 26 Drawing Sheets

(56) References Cited

U.S. PATENT DOCUMENTS

| | | | |
|---|---|---|---|
| 9,190,112 | B1 | 11/2015 | Bayang et al. |
| 10,475,477 | B1 | 11/2019 | Biskeborn |
| 11,341,994 | B1 | 5/2022 | Goker et al. |
| 11,705,159 | B2 * | 7/2023 | Kaneko ................. G11B 23/042 360/134 |
| 2003/0067704 | A1 | 4/2003 | Woo et al. |
| 2005/0283671 | A1 | 12/2005 | Stave |
| 2006/0285240 | A1 | 12/2006 | Jurneke |
| 2008/0019226 | A1 * | 1/2008 | Sasage ................. G06F 3/0685 369/30.44 |
| 2009/0323218 | A1 | 12/2009 | Thompson et al. |
| 2013/0044386 | A1 | 2/2013 | Sato |
| 2019/0073252 | A1 | 3/2019 | Tokai et al. |
| 2021/0088977 | A1 | 3/2021 | Lindich |
| 2021/0233567 | A1 | 7/2021 | Tochikubo et al. |
| 2021/0249044 | A1 * | 8/2021 | Nakashio ................. G11B 15/43 |
| 2022/0254370 | A1 | 8/2022 | Yamaga et al. |
| 2022/0254375 | A1 * | 8/2022 | Kaneko ................. G11B 15/06 |
| 2023/0206954 | A1 * | 6/2023 | Kataoka ................. G11B 33/10 360/69 |

FOREIGN PATENT DOCUMENTS

| | | | |
|---|---|---|---|
| JP | H07-320473 | A | 12/1995 |
| JP | 2000-285634 | A | 10/2000 |
| JP | 2005-158175 | A | 6/2005 |
| JP | 2008-171180 | A | 7/2008 |
| JP | 2013-041646 | A | 2/2013 |
| JP | 2019-046522 | A | 3/2019 |
| JP | 6669326 | B1 | 3/2020 |
| WO | 2020/027331 | A1 | 2/2020 |

OTHER PUBLICATIONS

Non-Final Office Action issued by USPTO on Dec. 2, 2022, in related U.S. Appl. No. 17/591,593.

Notice of Allowance issued by USPTO on Mar. 20, 2023 in related U.S. Appl. No. 17/591,593.

English language translation of the following: Notice dated Jul. 30, 2024 from the JPO in a Japanese patent application No. 2021-017747 corresponding to the instant patent application. This office action translation is submitted now in order to supplement the understanding of the cited references which are being disclosed in the instant Information Disclosure Statement.

* cited by examiner

| IDENTIFICATION ID | ALLOWABLE RANGE OF TEMPERATURE/HUMIDITY | | | | UPPER LIMIT OF PRESERVATION PERIOD | UPPER LIMIT OF USE FREQUENCY |
|---|---|---|---|---|---|---|
| | TEMPERATURE LOWER LIMIT | TEMPERATURE UPPER LIMIT | HUMIDITY LOWER LIMIT | HUMIDITY UPPER LIMIT | | |
| ... | ... | ... | ... | ... | ... | ... |
| FS-0900 | 15°C | 38°C | 15% | 80% | 100000 HOURS | 10000 TIMES |
| FS-1000 | 16°C | 32°C | 20% | 80% | 120000 HOURS | 10000 TIMES |
| FS-1050 | 10°C | 40°C | 10% | 90% | 150000 HOURS | 15000 TIMES |
| ... | ... | ... | ... | ... | ... | ... |

FIG. 27

CONTROL DEVICE 38

ASIC 120

STORAGE 122

| IDENTIFICATION ID | ALLOWABLE RANGE OF TEMPERATURE/HUMIDITY | | | | UPPER LIMIT OF PRESERVATION PERIOD | UPPER LIMIT OF USE FREQUENCY | ALLOWABLE RANGE OF TENSION | |
|---|---|---|---|---|---|---|---|---|
| | TEMPERATURE LOWER LIMIT | TEMPERATURE UPPER LIMIT | HUMIDITY LOWER LIMIT | HUMIDITY UPPER LIMIT | | | TENSION LOWER LIMIT | TENSION UPPER LIMIT |
| ... | ... | ... | ... | ... | ... | ... | ... | ... |
| FS-0900 | 15°C | 38°C | 15% | 80% | 100000 HOURS | 10000 TIMES | 0.7 N | 1.0 N |
| FS-1000 | 16°C | 32°C | 20% | 80% | 120000 HOURS | 10000 TIMES | 0.6 N | 1.2 N |
| FS-1050 | 10°C | 40°C | 10% | 90% | 150000 HOURS | 15000 TIMES | 0.45 N | 1.25 N |
| ... | ... | ... | ... | ... | ... | ... | ... | ... |

160

124

MAGNETIC TAPE CARTRIDGE, MAGNETIC TAPE DRIVE, MAGNETIC TAPE SYSTEM, AND METHOD OF OPERATING MAGNETIC TAPE DRIVE

CROSS-REFERENCE TO RELATED APPLICATIONS

The present application is a divisional application of U.S. Ser. No. 17/591,593, filed on Feb. 2, 2022, which claims priority under 35 U.S.C. § 119 to Japanese Patent Application No. 2021-017747, filed on Feb. 5, 2021. Each of the above applications is hereby expressly incorporated by reference, in its entirety, into the present application.

BACKGROUND

1. Technical Field

A technique of the present disclosure relates to a magnetic tape cartridge, a magnetic tape drive, a magnetic tape system, and a method of operating a magnetic tape drive.

2. Description of the Related Art

A cartridge memory that stores information is mounted in a magnetic tape cartridge in which a magnetic tape is housed. JP6669326B discloses storing information at the time of data recording onto a magnetic tape by a magnetic tape drive in a cartridge memory and reading out and referring to information from the cartridge memory at the time of data reading. Information includes information regarding temperature/humidity at the time of data recording, information regarding tension applied to the running magnetic tape at the time of data recording, and the like.

While a magnetic tape cassette, not a magnetic tape cartridge, is described, JP2000-285634A and JP1993-290445A (JP-H05-290445A) describe storing a use frequency and/or a cumulative use time of a magnetic tape.

SUMMARY

Many kinds of magnetic tapes have been released from each manufacturer, and a plurality of kinds of magnetic tapes are different in characteristics. For example, an allowable range of temperature/humidity in using a magnetic tape is 15° C.20% to 35° C.80% for a magnetic tape A and is 10° C.10% to 40° C.90% for a magnetic tape B. Alternatively, an upper limit of a preservation period and an upper limit of a use frequency of a magnetic tape are 100000 hours and 10000 times for a magnetic tape C and are 150000 hours and 15000 times for a magnetic tape D. In a case where the magnetic tapes having various characteristics are not appropriately controlled corresponding to the characteristics, there is a concern that writing and/or reading of data is hindered.

An embodiment according to the technique of the present disclosure provides a magnetic tape cartridge, a magnetic tape drive, a magnetic tape system, and a method of operating a magnetic tape drive capable of obtaining information for appropriately controlling a magnetic tape.

A magnetic tape cartridge of the present disclosure comprises a case in which a magnetic tape is housed, and a storage medium provided in the case. The storage medium stores at least one of temperature/humidity allowable range related information regarding an allowable range of temperature/humidity in using the magnetic tape, preservation period upper limit related information regarding an upper limit of a preservation period of the magnetic tape, or use frequency upper limit related information regarding an upper limit of a use frequency of the magnetic tape.

It is preferable that the temperature/humidity allowable range related information is a numerical value itself representing the allowable range of the temperature/humidity or first identification information corresponding to the numerical value representing the allowable range of the temperature/humidity.

It is preferable that the preservation period upper limit related information is a numerical value itself representing the upper limit of the preservation period or second identification information corresponding to the numerical value representing the upper limit of the preservation period.

It is preferable that the use frequency upper limit related information is a numerical value itself representing the upper limit of the use frequency or third identification information corresponding to the numerical value representing the upper limit of the use frequency.

It is preferable that the storage medium includes an internal memory incorporated in a noncontact communication medium where reading-out and writing-in of information are performed by a noncontact reading and writing device.

It is preferable that at least one of the temperature/humidity allowable range related information, the preservation period upper limit related information, or the use frequency upper limit related information is stored in a storage block of the internal memory where information is unrewritable.

It is preferable that the storage medium includes a region of a part of the magnetic tape.

It is preferable that the storage medium also stores tension allowable range related information regarding an allowable range of tension applied to the magnetic tape. In this case, it is preferable that the tension allowable range related information is a numerical value itself representing the allowable range of the tension or fourth identification information corresponding to the numerical value representing the allowable range of the tension.

A magnetic tape drive of the present disclosure is a magnetic tape drive in which any one magnetic tape cartridge described above is loaded, and comprises a read-out device that reads out at least one of temperature/humidity allowable range related information, preservation period upper limit related information, or use frequency upper limit related information stored in a storage medium, at least one of a temperature/humidity acquisition unit that acquires temperature/humidity detected by a temperature/humidity sensor, an elapsed time acquisition unit that acquires an elapsed time from a date of manufacture of the loaded magnetic tape cartridge or an elapsed time after data is recorded on a magnetic tape, and a use frequency acquisition unit that acquires a previous use frequency of the magnetic tape housed in the loaded magnetic tape cartridge, and a controller that performs control based on at least one of the temperature/humidity acquired by the temperature/humidity acquisition unit and an allowable range of the temperature/humidity, the elapsed time acquired by the elapsed time acquisition unit and an upper limit of a preservation period, or the use frequency acquired by the use frequency acquisition unit and an upper limit of the use frequency.

It is preferable that the controller performs control for permitting use of the magnetic tape in at least one of a case where the temperature/humidity acquired by the temperature/humidity acquisition unit is within the allowable range of the temperature/humidity, a case where the elapsed time acquired by the elapsed time acquisition unit falls below the upper limit of the preservation period, or a case where the use frequency acquired by the use frequency acquisition unit falls below the upper limit of the use frequency, and performs at least one of control for prohibiting the use of the magnetic tape or control for notifying of a warning indicating that the magnetic tape is unusable in at least one of a case where the temperature/humidity acquired by the temperature/humidity acquisition unit is outside the allowable range of the temperature/humidity, a case where the elapsed time acquired by the elapsed time acquisition unit is equal to or greater than the upper limit of the preservation period, or a case where the use frequency acquired by the use frequency acquisition unit is equal to or greater than the upper limit of the use frequency.

It is preferable that, in a case where the tension allowable range related information is also stored in the storage medium, the controller controls an operation of a tension application mechanism to apply tension within the allowable range represented by the tension allowable range related information to the magnetic tape.

A method of operating a magnetic tape drive of the present disclosure comprises reading out at least one of the temperature/humidity allowable range related information, the preservation period upper limit related information, or the use frequency upper limit related information stored in the storage medium included in any one magnetic tape cartridge described above, and performing control based on at least one of temperature/humidity detected by a temperature/humidity sensor and the allowable range of the temperature/humidity, an elapsed time from a date of manufacture of the loaded magnetic tape cartridge or an elapsed time after data is recorded on the magnetic tape and the upper limit of the preservation period, or a previous use frequency of the magnetic tape housed in the loaded magnetic tape cartridge and the upper limit of the use frequency.

It is preferable that the control includes control for permitting use of the magnetic tape in at least one of a case where the temperature/humidity detected by the temperature/humidity sensor is within the allowable range of the temperature/humidity, a case where the elapsed time falls below the upper limit of the preservation period, or a case where the use frequency falls below the upper limit of the use frequency, and at least one of control for prohibiting the use of the magnetic tape or control for notifying of a warning indicating that the magnetic tape is unusable in at least one of a case where the temperature/humidity detected by the temperature/humidity sensor is outside the allowable range of the temperature/humidity, a case where the elapsed time is equal to or greater than the upper limit of the preservation period, or a case where the use frequency is equal to or greater than the upper limit of the use frequency.

It is preferable that, in a case where the tension allowable range related information is also stored in the storage medium, the control includes controlling an operation of a tension application mechanism to apply tension within the allowable range represented by the tension allowable range related information to the magnetic tape.

A magnetic tape system of the present disclosure comprises any one magnetic tape cartridge described above, a read-out device that reads out at least one of temperature/humidity allowable range related information, preservation period upper limit related information, or use frequency upper limit related information stored in a storage medium, and a control device that performs control based on at least one of temperature/humidity detected by a temperature/humidity sensor and the allowable range of the temperature/humidity, an elapsed time from a date of manufacture of the loaded magnetic tape cartridge or an elapsed time after data is recorded on the magnetic tape and the upper limit of the preservation period, or a previous use frequency of the magnetic tape housed in the loaded magnetic tape cartridge and the upper limit of the use frequency.

It is preferable that the control device performs control for permitting use of the magnetic tape in at least one of a case where the temperature/humidity detected by the temperature/humidity sensor is within the allowable range of the temperature/humidity, a case where the elapsed time falls below the upper limit of the preservation period, or a case where the use frequency falls below the upper limit of the use frequency, and performs at least one of control for prohibiting the use of the magnetic tape or control for notifying of a warning indicating that the magnetic tape is unusable in at least one of a case where the temperature/humidity detected by the temperature/humidity sensor is outside the allowable range of the temperature/humidity, a case where the elapsed time is equal to or greater than the upper limit of the preservation period, or a case where the use frequency is equal to or greater than the upper limit of the use frequency.

It is preferable that, in a case where the tension allowable range related information is also stored in the storage medium, the control device controls an operation of a tension application mechanism to apply tension within the allowable range represented by the tension allowable range related information to the magnetic tape.

According to the technique of the present disclosure, it is possible to provide a magnetic tape cartridge, a magnetic tape drive, a magnetic tape system, and a method of operating a magnetic tape drive capable of obtaining information for appropriately controlling a magnetic tape.

BRIEF DESCRIPTION OF THE DRAWINGS

Exemplary embodiments according to the technique of the present disclosure will be described in detail based on the following figures, wherein:

FIG. 27 is a diagram showing an example of an aspect in which, in addition to the allowable range of the temperature/humidity, the upper limit of the preservation period, and the upper limit of the use frequency, an allowable range of tension is registered in an information table;

DETAILED DESCRIPTION

Figure 1:
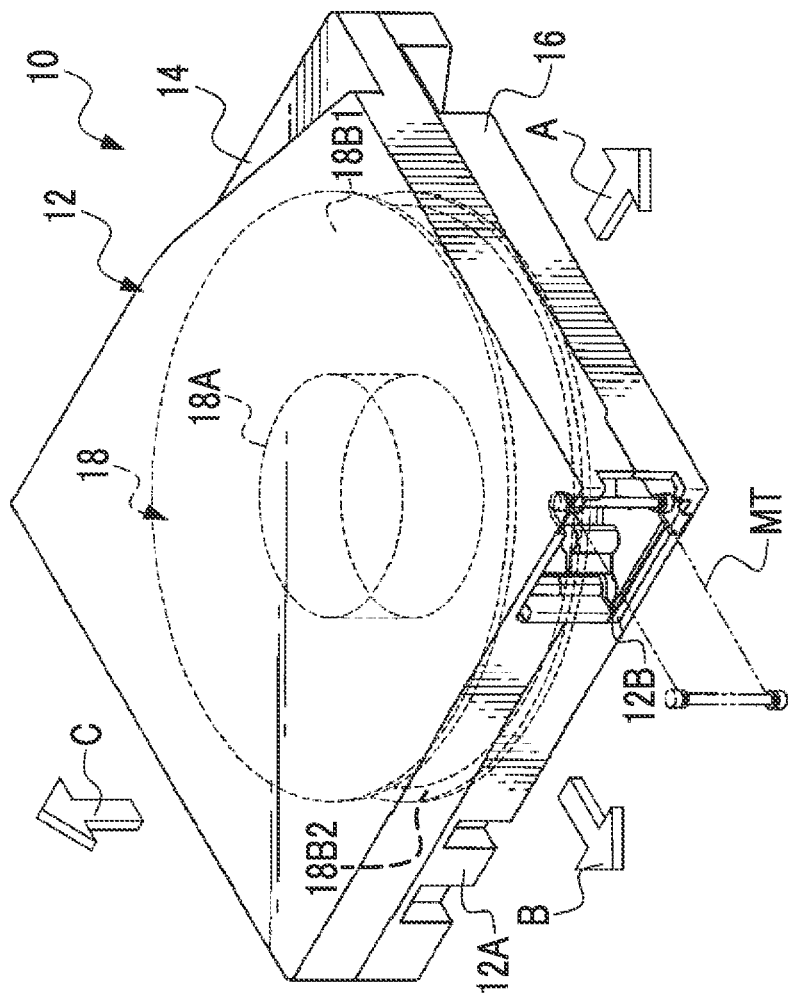
FIG. 1 is a schematic perspective view showing an example of the appearance of a magnetic tape cartridge.

Hereinafter, an example of an embodiment of a magnetic tape cartridge, a magnetic tape drive, a magnetic tape system, and a method of operating a magnetic tape drive according to the technique of the present disclosure will be described referring to the accompanying drawings.

First, terms that are used in the following description will be described.

CPU is an abbreviation for "Central Processing Unit". RAM is an abbreviation for "Random Access Memory". DRAM is an abbreviation for "Dynamic Random Access Memory". SRAM is an abbreviation for "Static Random Access Memory". NVM is an abbreviation for "Non-Volatile Memory". ROM is an abbreviation for "Read Only Memory". EEPROM is an abbreviation for "Electrically Erasable and Programmable Read Only Memory". ASIC is an abbreviation for "Application Specific Integrated Circuit". PLD is an abbreviation for "Programmable Logic Device". FPGA is an abbreviation for "Field-Programmable Gate Array". SoC is an abbreviation for "System-on-a-Chip". IC is an abbreviation for "Integrated Circuit". RFID is an abbreviation for "Radio Frequency IDentifier". LTO is an abbreviation for "Linear Tape-Open". IBM is an abbreviation for "International Business Machines Corporation". ID is an abbreviation for "Identification Data". BOT is an abbreviation for "Beginning Of Tape". EOT is an abbreviation for "End Of Tape". ISO is an abbreviation for "International Organization for Standardization". ECMA is an abbreviation for "European Computer Manufacturers Association".

First Embodiment

An example of the configuration of a magnetic tape cartridge 10 will be described referring to FIGS. 1 to 3. In the following description, for convenience of description, in FIGS. 1 to 3, a loading direction of the magnetic tape cartridge 10 in a magnetic tape drive 30 (see FIG. 4) is indicated by an arrow A, a direction of the arrow A is referred to a front direction of the magnetic tape cartridge 10, and a side in the front direction of the magnetic tape cartridge 10 is referred to as a front side of the magnetic tape cartridge 10. In the following description of the structure, "front" indicates the front side of the magnetic tape cartridge 10.

In the following description, for convenience of description, in FIGS. 1 to 3, a direction of an arrow B perpendicular to the direction of the arrow A is referred to as a right direction, and a side in the right direction of the magnetic tape cartridge 10 is referred to as a right side of the magnetic tape cartridge 10. In the following description of the structure, "right" indicates the right side of the magnetic tape cartridge 10.

In the following description, for convenience of description, in FIGS. 1 to 3, a direction perpendicular to the direction of the arrow A and the direction of the arrow B is indicated by an arrow C, a direction of the arrow C is referred to as an upper direction of the magnetic tape cartridge 10, and a side in the upper direction of the magnetic tape cartridge 10 is referred to as an upper side of the magnetic tape cartridge 10. In the following description of the structure, "upper" indicates the upper side of the magnetic tape cartridge 10.

In the following description, for convenience of description, in FIGS. 1 to 3, a direction opposite to the front direction of the magnetic tape cartridge 10 is referred to as a rear direction of the magnetic tape cartridge 10, and a side in the rear direction of the magnetic tape cartridge 10 is referred to as a rear side of the magnetic tape cartridge 10. In the following description of the structure, "rear" indicates the rear side of the magnetic tape cartridge 10.

In the following description, for convenience of description, in FIGS. 1 to 3, a direction opposite to the right direction of the magnetic tape cartridge 10 is referred to as a left direction of the magnetic tape cartridge 10, and a side in the left direction of the magnetic tape cartridge 10 is referred to as a left side of the magnetic tape cartridge 10. In the following description of the structure, "left" indicates the left side of the magnetic tape cartridge 10.

In the following description, for convenience of description, in FIGS. 1 to 3, a direction opposite to the upper direction of the magnetic tape cartridge 10 is referred to as a lower direction of the magnetic tape cartridge 10, and a side in the lower direction of the magnetic tape cartridge 10 is referred to as a lower side of the magnetic tape cartridge 10. In the following description of the structure, "lower" indicates the lower side of the magnetic tape cartridge 10.

In the following description, although LTO will be described as an example of the specification of the magnetic tape cartridge 10, this is merely an example, and the specification of the magnetic tape cartridge 10 may conform to the specification of IBM3592 or the like.

As shown in FIG. 1 as an example, the magnetic tape cartridge 10 has a substantially rectangular shape in plan view, and comprises a box-shaped case 12. A magnetic tape MT is housed in the case 12. The case 12 is formed of resin, such as polycarbonate, and comprises an upper case 14 and a lower case 16. The upper case 14 and the lower case 16 are bonded by welding (for example, ultrasonic welding) and screwing in a state in which a lower peripheral edge surface of the upper case 14 and an upper peripheral edge surface of the lower case 16 are brought into contact with each other. A bonding method is not limited to welding and screwing, and other bonding methods may be used.

Inside the case 12, a cartridge reel 18 is rotatably housed. The cartridge reel 18 comprises a reel hub 18A, an upper flange 18B1, and a lower flange 18B2. The reel hub 18A is formed in a cylindrical shape. The reel hub 18A is a shaft center portion of the cartridge reel 18, has a shaft center direction along an up-down direction of the case 12, and is disposed in a center portion of the case 12. Each of the upper flange 18B1 and the lower flange 18B2 is formed in an annular shape. A center portion in plan view of the upper flange 18B1 is fixed to an upper end portion of the reel hub 18A, and a center portion in plan view of the lower flange 18B2 is fixed to a lower end portion of the reel hub 18A. The magnetic tape MT is wound around an outer peripheral surface of the reel hub 18A, and an end portion in a width direction of the magnetic tape MT is held by the upper flange 18B1 and the lower flange 18B2. The reel hub 18A and the upper flange 18B 1 and/or the lower flange 18B2 may be molded integrally.

An opening 12B is formed on a front side of a right wall 12A of the case 12. The magnetic tape MT is pulled out from the opening 12B.

Figure 2:
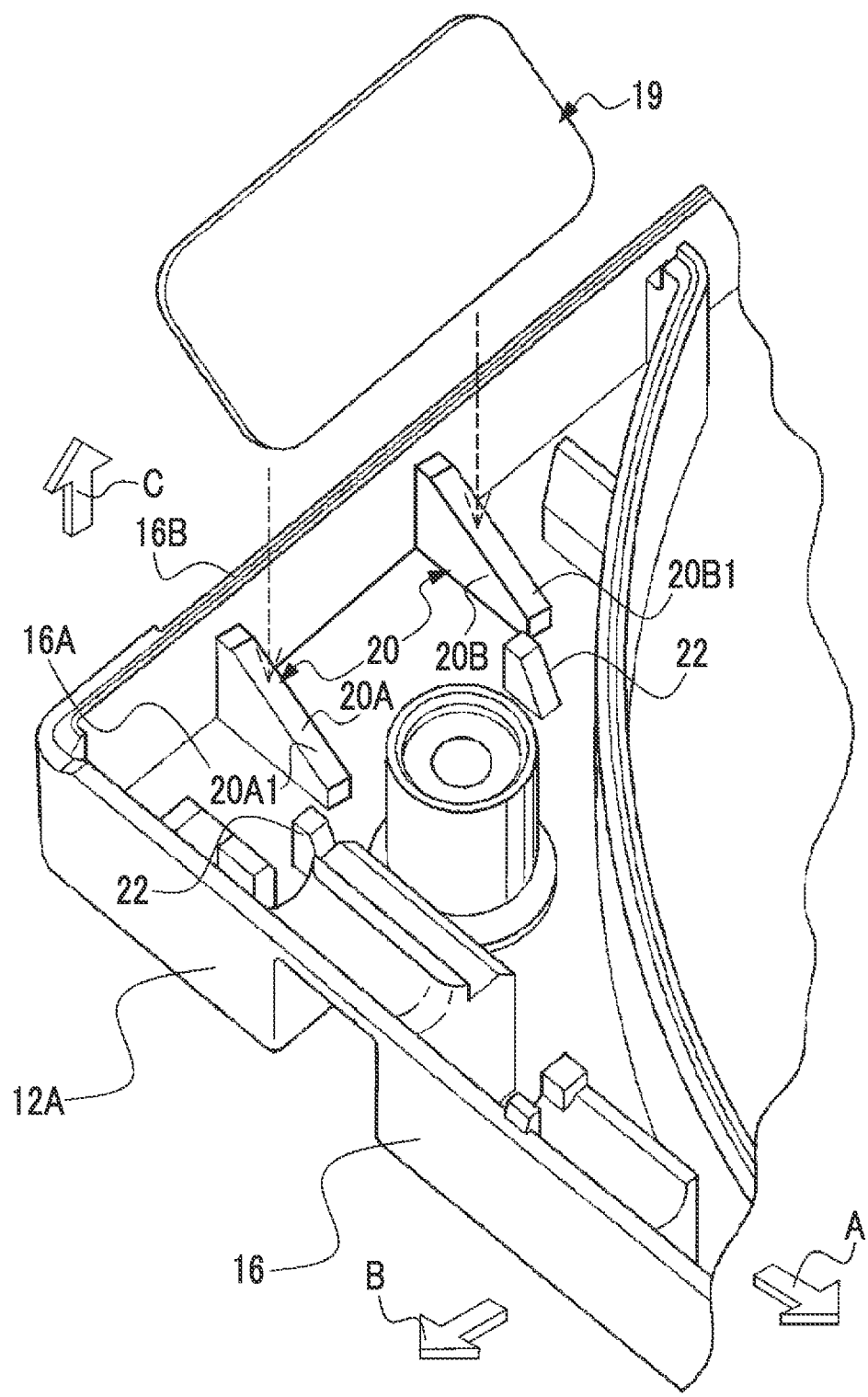
FIG. 2 is a schematic perspective view showing an example of the structure of a rear right end portion inside a lower case of the magnetic tape cartridge.

As shown in FIG. 2 as an example, a cartridge memory 19 is housed in a rear right end portion of the lower case 16. The cartridge memory 19 is an example of a "noncontact communication medium" according to the technique of the present disclosure. In the embodiment, a so-called passive type RFID tag is employed as the cartridge memory 19.

Information regarding the magnetic tape MT is stored in the cartridge memory 19. Information regarding the magnetic tape MT indicates, for example, management information for managing the magnetic tape cartridge 10. Examples of the management information include information regarding the cartridge memory 19, information capable of specifying the magnetic tape cartridge 10, and information indicating a recording capacity of the magnetic tape MT, the outline of data recorded on the magnetic tape MT, items of data, and a recording format of data.

The cartridge memory 19 performs communication with a noncontact reading and writing device in a noncontact manner. Examples of the noncontact reading and writing device include a noncontact reading and writing device (for example, a noncontact reading and writing device 50B shown in FIG. 13) that is used in a production process of the magnetic tape cartridge 10 and a noncontact reading and writing device (for example, a noncontact reading and writing device 50A shown in FIGS. 4 to 6, and 16) that is used in the magnetic tape drive (for example, the magnetic tape drive 30 shown in FIG. 4).

The noncontact reading and writing device performs reading and writing of various kinds of information from and to the cartridge memory 19 in a noncontact manner. Although details will be described below, the cartridge memory 19 generates power with electromagnetic application to a magnetic field MF (see FIG. 5 and the like) from the noncontact reading and writing device. Then, the cartridge memory 19 operates using the generated power and performs transfer of various kinds of information with the noncontact reading and writing device by performing communication with the noncontact reading and writing device through the magnetic field MF. As a communication system of the noncontact reading and writing device and the cartridge memory 19, for example, a system conforming to a known standard, such as ISO14443 or ISO18092, can be employed. Alternatively, a system conforming to the specification of the LTO, such as ECMA319, can be employed.

As shown in FIG. 2 as an example, a support member 20 is provided on an inner surface of a bottom plate 16A in the rear right end portion of the lower case 16. The support member 20 is a pair of inclined mounts that supports the cartridge memory 19 from below in an inclined state. A pair of inclined mounts is a first inclined mount 20A and a second inclined mount 20B. The first inclined mount 20A and the second inclined mount 20B are disposed at an interval in a right-left direction of the case 12 and are integrated with an inner surface of a rear wall 16B of the lower case 16 and the inner surface of the bottom plate 16A. The first inclined mount 20A has an inclined surface 20A1, and the inclined surface 20A1 is inclined downward from the inner surface of the rear wall 16B toward the inner surface of the bottom plate 16A. The second inclined mount 20B has an inclined surface 20B 1, and the inclined surface 20B1 is also inclined downward from the inner surface of the rear wall 16B toward the inner surface of the bottom plate 16A.

In front of the support member 20, a pair of position restriction ribs 22 is disposed at an interval in the right-left direction. A pair of position restriction ribs 22 is provided upright on the inner surface of the bottom plate 16A and restricts a position of a lower end portion of the cartridge memory 19 in a state of being disposed on the support member 20.

Figure 3:
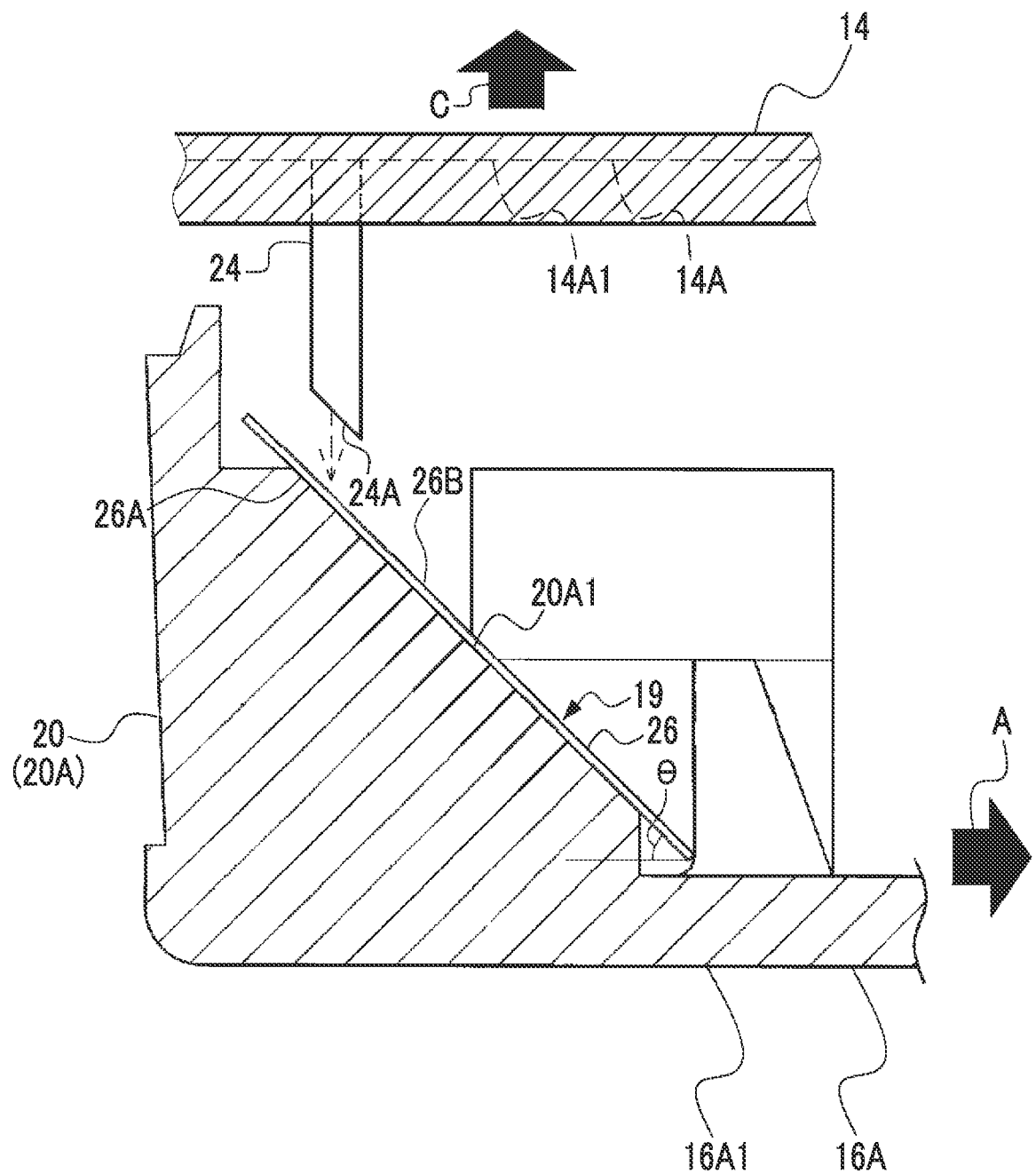
FIG. 3 is a side cross-sectional view showing an example of a support member provided on an inner surface of the lower case of the magnetic tape cartridge.

As shown in FIG. 3 as an example, a reference surface 16A1 is formed on an outer surface of the bottom plate 16A. The reference surface 16A1 is a plane. Here, the plane indicates a surface parallel to a horizontal plane in a case where the lower case 16 is placed on the horizontal plane such that the bottom plate 16A turns toward a lower side. Here, "parallel" indicates parallel in a meaning including an error that is generally allowed in the technical field to which the technique of the present disclosure belongs, and an error to such an extent not contrary to the spirit and scope of the technique of that the present disclosure, in addition to completely parallel. An inclination angle θ of the support member 20, that is, an inclination angle of each of the inclined surface 20A1 and the inclined surface 20B1 (see FIG. 2) is 45 degrees with respect to the reference surface 16A1. The inclination angle of 45 degrees is merely an example, and may be in a range of "0 degrees<inclination angle θ<45 degrees" or may be "45 degrees≤inclination angle θ".

The cartridge memory 19 comprises a substrate 26. The substrate 26 is placed on the support member 20 such that a back surface 26A of the substrate 26 turns toward a lower side, and the support member 20 supports the back surface 26A of the substrate 26 from below. A part of the back surface 26A of the substrate 26 is in contact with the inclined surface of the support member 20, that is, the inclined surfaces 20A1 and 20B1 (see FIG. 2), and a front surface 26B of the substrate 26 is exposed to an inner surface 14A1 side of a top plate 14A of the upper case 14.

The upper case 14 comprises a plurality of ribs 24. A plurality of ribs 24 are disposed at intervals in the right-left direction of the case 12. A plurality of ribs 24 are provided to protrude downward from the inner surface 14A1 of the top plate 14A of the upper case 14, and a distal end surface 24A of each rib 24 has an inclined surface corresponding to the inclined surfaces 20A1 and 20B1 (see FIG. 2). That is, the distal end surface 24A of each rib 24 is inclined at 45 degrees with respect to the reference surface 16A1.

In a case where the upper case 14 is bonded to the lower case 16 as described above in a state in which the cartridge memory 19 is disposed on the support member 20, the distal end surface 24A of each rib 24 comes into contact with the substrate 26 from the front surface 26B side, and the substrate 26 is pinched by the distal end surface 24A of each rib 24 and the inclined surfaces 20A1 and 20B1 (see FIG. 2) of the support member 20. With this, a position in an up-down direction of the cartridge memory 19 is restricted by the ribs 24.

Figure 4:
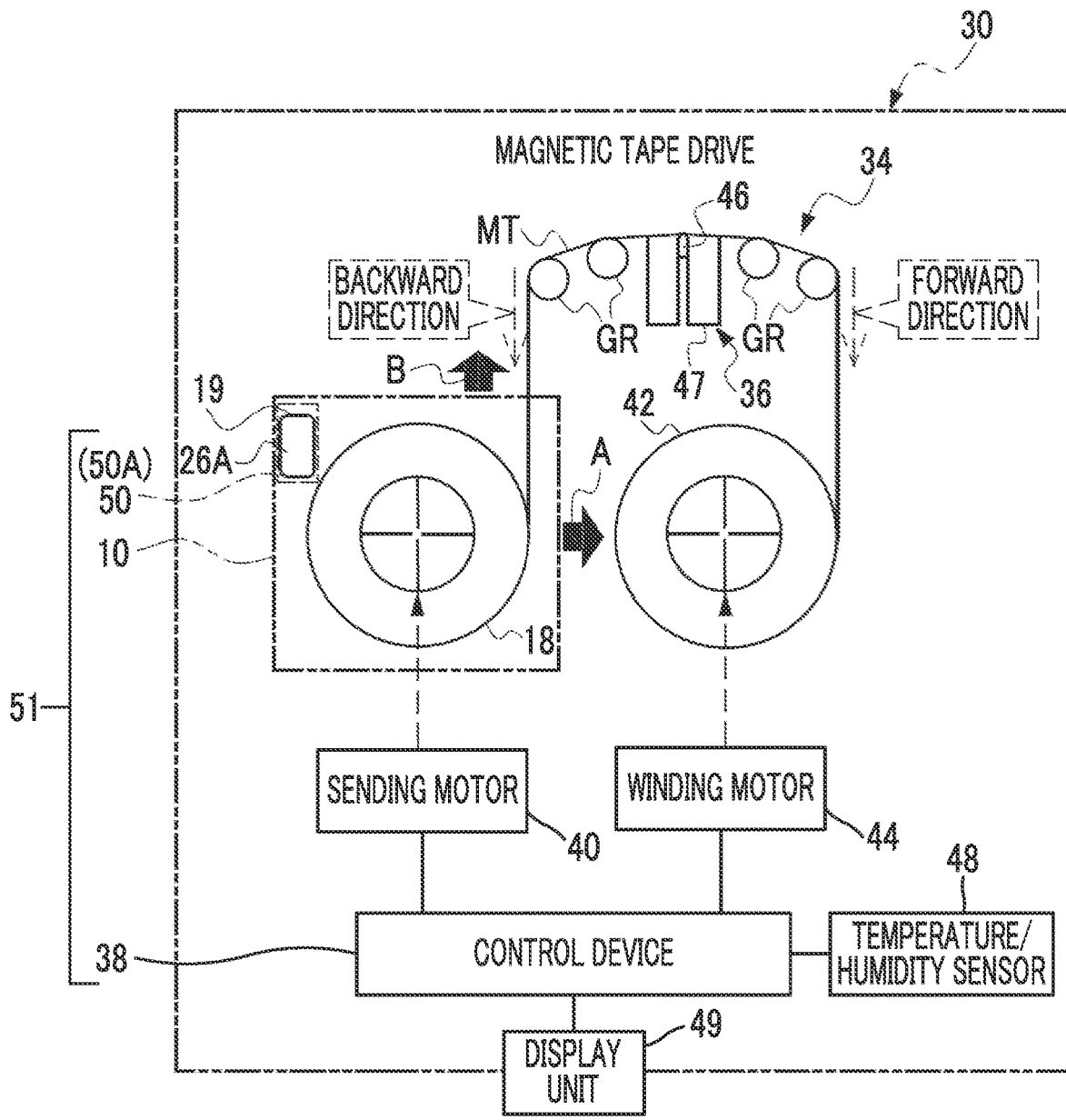
FIG. 4 is a schematic configuration diagram showing an example of the hardware configuration of a magnetic tape drive.

As shown in FIG. 4 as an example, the magnetic tape drive 30 comprises a transport device 34, a magnetic head 36, and a control device 38. The magnetic tape cartridge 10 is loaded in the magnetic tape drive 30. The magnetic tape drive 30 is a device that pulls out the magnetic tape MT from the magnetic tape cartridge 10, records data on the pulled-out magnetic tape MT using the magnetic head 36, and reads data from the pulled-out magnetic tape MT using the magnetic head 36 in a linear serpentine method. In the embodiment, in other words, reading of data indicates reproduction of data.

The control device 38 controls the operation of the entire magnetic tape drive 30. In the embodiment, although the control device 38 is realized by an ASIC 120 (see FIG. 15), the technique of the present disclosure is not limited thereto. For example, the control device 38 may be realized by an FPGA. Alternatively, the control device 38 may be realized by a computer including a CPU, a ROM, and a RAM. In addition, the control device 38 may be realized by a combination of two or more of the ASIC 120, the FPGA, and the computer. That is, the control device 38 may be realized by a combination of a hardware configuration and a software configuration.

The transport device 34 is a device that selectively transports the magnetic tape MT in a forward direction and a backward direction, and comprises a sending motor 40, a winding reel 42, a winding motor 44, a plurality of guide rollers GR, and the control device 38. Here, the forward direction indicates a sending direction of the magnetic tape MT, and the backward direction indicates a rewinding direction of the magnetic tape MT.

The sending motor 40 rotates the cartridge reel 18 in the magnetic tape cartridge 10 under the control of the control device 38. The control device 38 controls the sending motor 40 to control a rotation direction, a rotation speed, rotation torque, and the like of the cartridge reel 18.

In a case where the magnetic tape MT is wound around the winding reel 42 (loaded), the control device 38 rotates the sending motor 40 such that the magnetic tape MT runs in the forward direction. A rotation speed, rotation torque, and the like of the sending motor 40 are adjusted depending on a speed of the magnetic tape MT wound around the winding reel 42.

The winding motor 44 rotates the winding reel 42 under the control of the control device 38. The control device 38 controls the winding motor 44 to control a rotation direction, a rotation speed, rotation torque, and the like of the winding reel 42.

In a case where the magnetic tape MT is wound around the winding reel 42, the control device 38 rotates the winding motor 44 such that the magnetic tape MT runs in the forward direction. A rotation speed, rotation torque, and the like of the winding motor 44 are adjusted depending on the speed of the magnetic tape MT wound around the winding reel 42. The rotation speed, the rotation torque, and the like of each of the sending motor 40 and the winding motor 44 are adjusted in this manner, whereby tension is applied to the magnetic tape MT. That is, the sending motor 40 and the winding motor 44 are an example of a "tension application mechanism" according to the technique of the present disclosure.

In a case of rewinding (unloading) the magnetic tape MT to the cartridge reel 18, the control device 38 rotates the sending motor 40 and the winding motor 44 such that the magnetic tape MT runs in the backward direction.

In the embodiment, although the tension applied to the magnetic tape MT is controlled by controlling the rotation speed, the rotation torque, and the like of the sending motor 40 and the winding motor 44, the technique of the present disclosure is not limited thereto. For example, the tension applied to the magnetic tape MT may be controlled using a dancer roller or may be controlled by drawing the magnetic tape MT to a vacuum chamber.

Each of a plurality of guide rollers GR is a roller that guides the magnetic tape MT. A running path of the magnetic tape MT is determined by separately disposing a plurality of guide rollers GR at positions straddling over the magnetic head 36 between the magnetic tape cartridge 10 and the winding reel 42.

The magnetic head 36 comprises a recording and reading element 46 and a holder 47. The recording and reading element 46 is held by the holder 47 to come into contact with the running magnetic tape MT and records data on the magnetic tape MT transported by the transport device 34 or reads data from the magnetic tape MT.

The magnetic tape drive 30 comprises the noncontact reading and writing device 50. The noncontact reading and writing device 50 is disposed to confront the back surface 26A of the cartridge memory 19 below the magnetic tape cartridge 10 in a state in which the magnetic tape cartridge 10 is loaded. The state in which the magnetic tape cartridge 10 is loaded in the magnetic tape drive 30 indicates, for example, a state in which the magnetic tape cartridge 10 reaches a position determined in advance as a position where reading of data from the magnetic tape MT by the magnetic head 36 starts.

In the example shown in FIG. 4, although an aspect example where the noncontact reading and writing device 50 is mounted on the magnetic tape drive 30 has been described, the technique of the present disclosure is not limited thereto. The noncontact reading and writing device 50 is used even in a stage in which the magnetic tape cartridge 10 is manufactured, a stage in which the magnetic tape cartridge 10 is inspected, or a stage in which the magnetic tape cartridge 10 is shipped. In this case, for example, a stationary or portable noncontact reading and writing device 50 is used. In the following description, unless there is no need for distinction, the noncontact reading and writing device 50 mounted on the magnetic tape drive 30 is denoted as the noncontact reading and writing device 50A, and the stationary or portable noncontact reading and writing device 50 that is used in a stage in which the magnetic tape cartridge 10 is manufactured, a stage in which the magnetic tape cartridge 10 is inspected, or a stage in which the magnetic tape cartridge 10 is shipped is denoted as the noncontact reading and writing device 50B.

A temperature/humidity sensor 48 and a display unit 49 are connected to the control device 38. The temperature/humidity sensor 48 detects temperature/humidity in the magnetic tape drive 30. The temperature/humidity sensor 48 outputs the detected temperature/humidity to the control device 38. The display unit 49 is, for example, a liquid crystal display, and displays an operation state of the magnetic tape drive 30 under the control of the control device 38.

Figure 5:
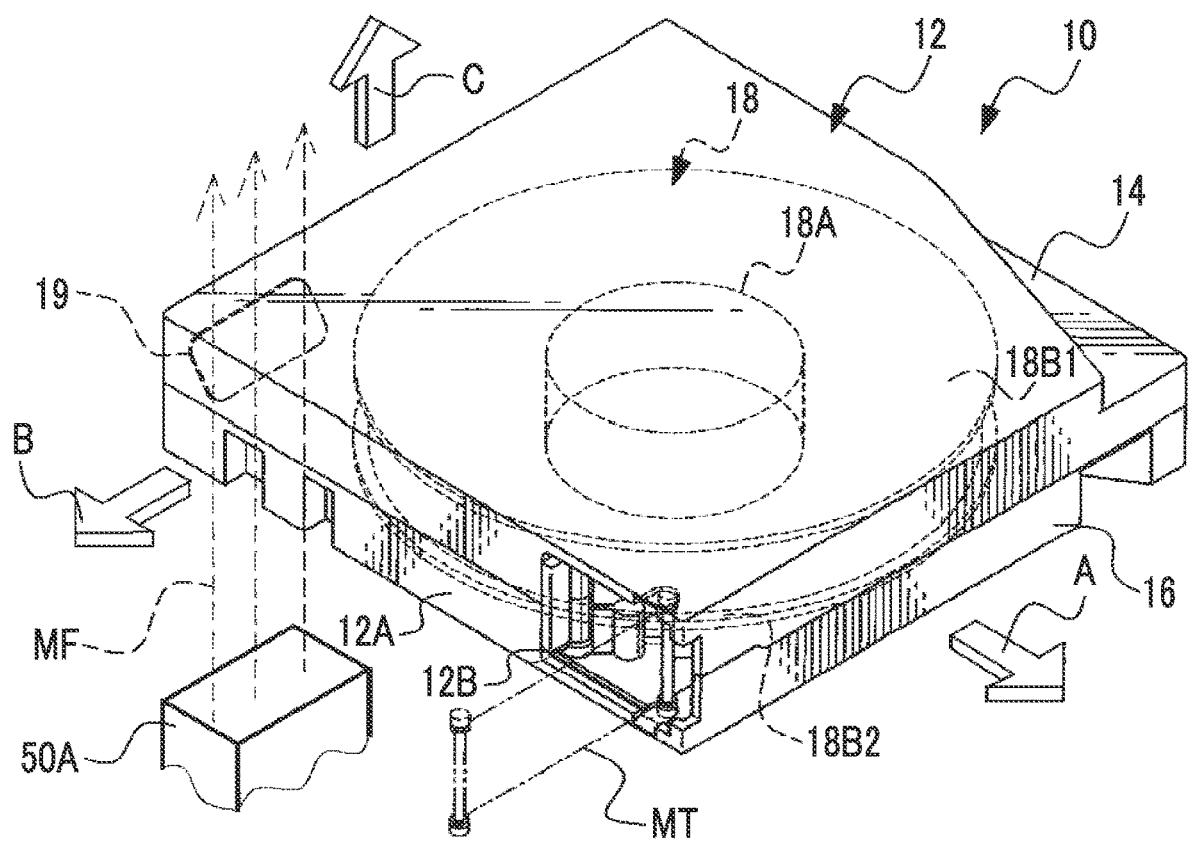
FIG. 5 is a schematic perspective view showing an example of an aspect in which a magnetic field is discharged from a lower side of the magnetic tape cartridge by a noncontact reading and writing device.

As shown in FIG. 5 as an example, the noncontact reading and writing device 50A emits a magnetic field MF from below the magnetic tape cartridge 10 toward the cartridge memory 19. The magnetic field MF passes through the cartridge memory 19.

Figure 6:
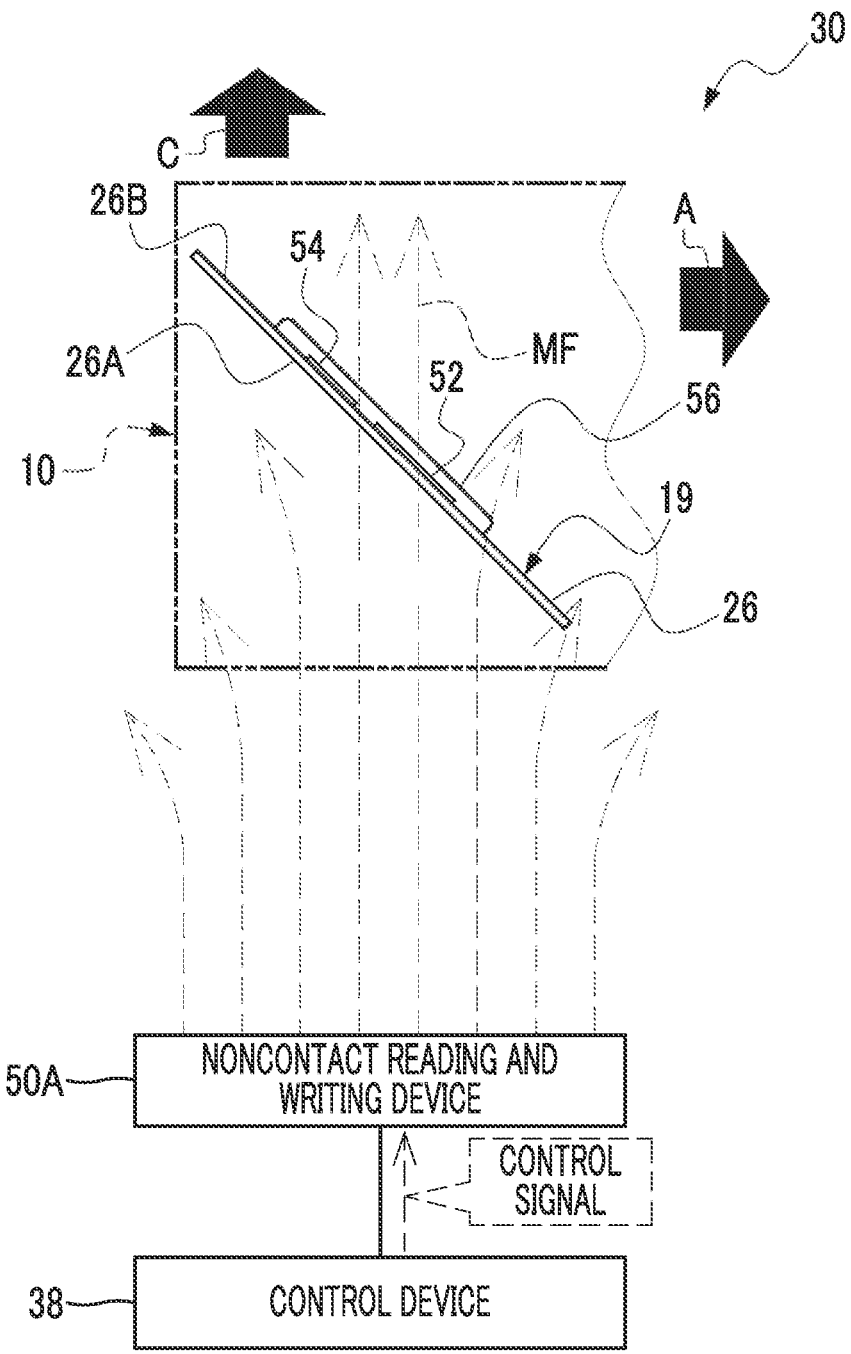
FIG. 6 is a conceptual diagram showing an example of an aspect in which a magnetic field is applied from the noncontact reading and writing device to a cartridge memory in the magnetic tape cartridge.

As shown in FIG. 6 as an example, the noncontact reading and writing device 50A is connected to the control device 38. The control device 38 outputs a control signal for controlling the cartridge memory 19 to the noncontact reading and writing device 50A. The noncontact reading and writing device 50A emits the magnetic field MF toward the cartridge memory 19 conforming to the control signal input from the control device 38. The magnetic field MF passes through the cartridge memory 19 from the back surface 26A side to the front surface 26B side.

The noncontact reading and writing device 50A gives a command signal corresponding to the control signal to the cartridge memory 19 by performing noncontact communication with the cartridge memory 19. In more detail, the noncontact reading and writing device 50A spatially transmits the command signal to the cartridge memory 19 under the control of the control device 38. Although details will be described below, the command signal is a signal indicating a command to the cartridge memory 19.

Here, although a form example where the noncontact reading and writing device 50A spatially transmits the command signal to the cartridge memory 19 under the control of the control device 38 has been described, the technique of the present disclosure is not limited thereto. For example, in a stage in which the magnetic tape cartridge 10 is manufactured, a stage in which the magnetic tape cartridge 10 is inspected, or a stage in which the magnetic tape cartridge 10 is shipped, the noncontact reading and writing device 50B spatially transmits the command signal to the cartridge memory 19 under the control of a control device different from the control device 38.

In a case where the command signal is spatially transmitted from the noncontact reading and writing device 50A to the cartridge memory 19, the command signal corresponding to an instruction from the control device 38 is included in the magnetic field MF by the noncontact reading and writing device 50A. In other words, the command signal is superimposed on the magnetic field MF by the noncontact reading and writing device 50A. That is, the noncontact reading and writing device 50A transmits the command signal to the cartridge memory 19 through the magnetic field MF under the control of the control device 38.

An IC chip 52 and a capacitor 54 are mounted on the front surface 26B of the cartridge memory 19. The IC chip 52 and the capacitor 54 are adhered to the front surface 26B. The IC chip 52 and the capacitor 54 are sealed with a sealing material 56 on the front surface 26B of the cartridge memory 19. Here, as the sealing material 56, ultraviolet curable resin that is cured by ultraviolet rays is employed. The ultraviolet curable resin is merely an example, and photocurable resin that is cured by light in a wavelength range other than ultraviolet rays may be used as the sealing material 56, thermosetting resin may be used as the sealing material 56, or other adhesives may be used as the sealing material 56.

Figure 7:
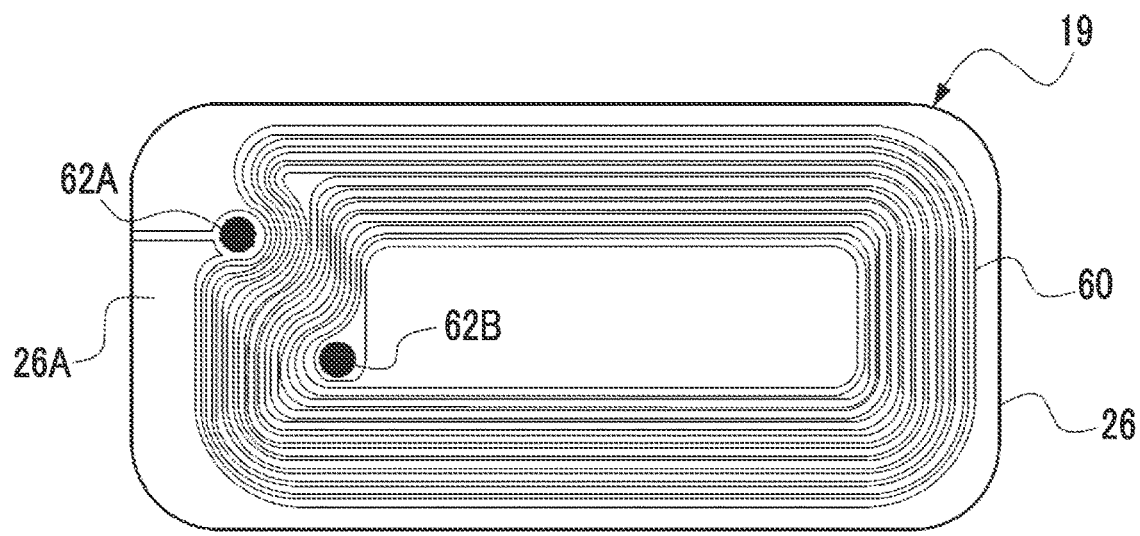
FIG. 7 is a schematic bottom view showing an example of the structure of a back surface of a substrate of the cartridge memory in the magnetic tape cartridge.

As shown in FIG. 7 as an example, a coil 60 is formed in a loop shape on the back surface 26A of the cartridge memory 19. Here, as a material of the coil 60, copper foil is employed. The copper foil is merely an example, and for example, other kinds of conductive materials, such as aluminum foil, may be used. The coil 60 induces an induced current with application of the magnetic field MF (see FIGS. 5 and 6) from the noncontact reading and writing device 50.

A first conduction portion 62A and a second conduction portion 62B are provided on the back surface 26A of the cartridge memory 19. The first conduction portion 62A and the second conduction portion 62B have solder, and electrically connect both end portions of the coil 60 to the IC chip 52 (see FIGS. 6 and 8) and the capacitor 54 (see FIGS. 6 and 8) on the front surface 26B.

Figure 8:
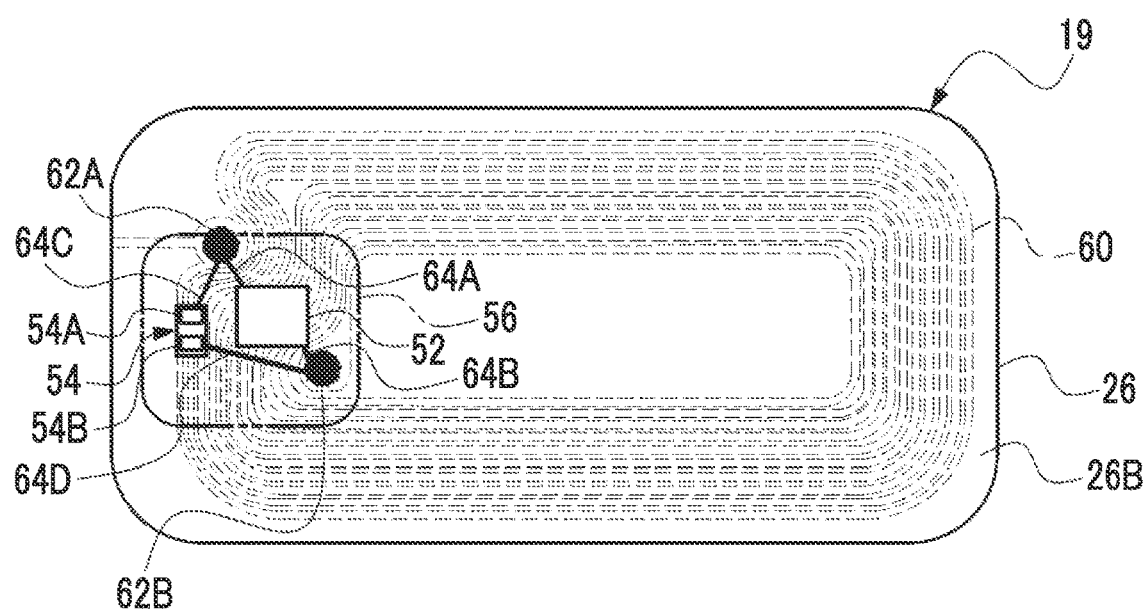
FIG. 8 is a schematic plan view showing an example of the structure of a front surface of the substrate of the cartridge memory in the magnetic tape cartridge.

As shown in FIG. 8 as an example, on the front surface 26B of the cartridge memory 19, the IC chip 52 and the capacitor 54 are electrically connected to each other using a wire connection method. Specifically, one terminal of a positive electrode terminal and a negative electrode terminal of the IC chip 52 is connected to the first conduction portion 62A through a wiring 64A, and the other terminal is connected to the second conduction portion 62B through a wiring 64B. The capacitor 54 has a pair of electrodes. In the example shown in FIG. 8, a pair of electrodes is electrodes 54A and 54B. The electrode 54A is connected to the first conduction portion 62A through a wiring 64C, and the electrode 54B is connected to the second conduction portion 62B through a wiring 64D. With this, the IC chip 52 and the capacitor 54 are connected in parallel with the coil 60.

Figure 9:
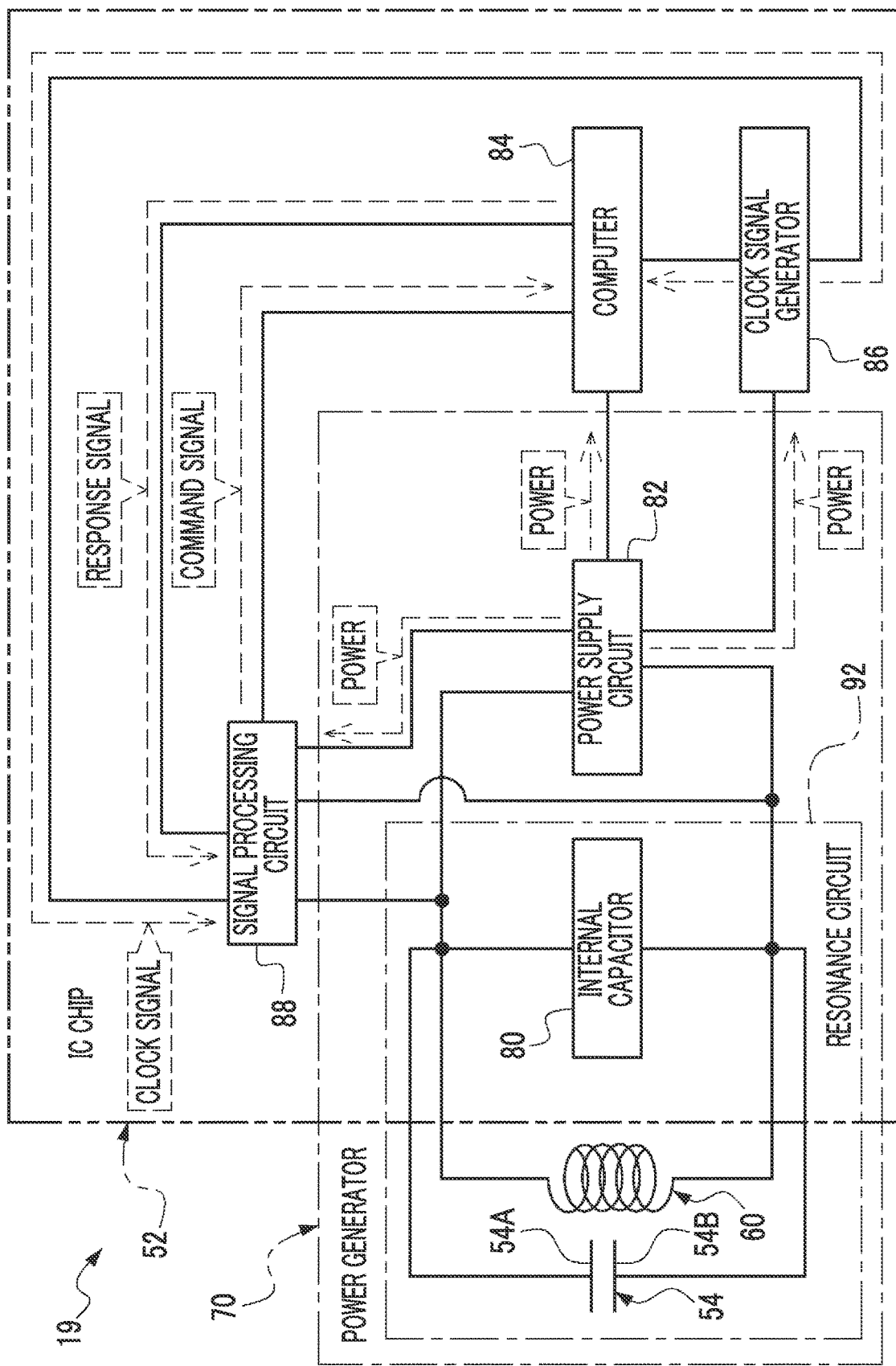
FIG. 9 is a schematic circuit diagram showing an example of the circuit configuration of the cartridge memory in the magnetic tape cartridge.

As shown in FIG. 9 as an example, the IC chip 52 comprises an internal capacitor 80, a power supply circuit 82, a computer 84, a clock signal generator 86, and a signal processing circuit 88. The IC chip 52 is a general-purpose IC chip that is usable for purposes other than the magnetic tape cartridge 10.

The cartridge memory 19 comprises a power generator 70. The power generator 70 generates power with application of the magnetic field MF from the noncontact reading and writing device 50 to the coil 60. Specifically, the power generator 70 generates alternating-current power using a resonance circuit 92, converts the generated alternating-current power into direct-current power, and outputs the direct-current power.

The power generator 70 has a resonance circuit 92 and a power supply circuit 82. The resonance circuit 92 comprises the capacitor 54, the coil 60, and the internal capacitor 80. The internal capacitor 80 is a capacitor incorporated in the IC chip 52, and the power supply circuit 82 is also a circuit incorporated in the IC chip 52. The internal capacitor 80 is connected in parallel with the coil 60.

The capacitor 54 is a capacitor externally attached to the IC chip 52. The IC chip 52 is a general-purpose IC chip that is intrinsically usable for purposes different from the magnetic tape cartridge 10. For this reason, the capacitance of the internal capacitor 80 may not be enough to realize a resonance frequency required for the cartridge memory 19 used in the magnetic tape cartridge 10. Accordingly, in the cartridge memory 19, the capacitor 54 is post-attached to the IC chip 52 as a capacitor having a capacitance value necessary in making the resonance circuit 92 resonate at a resonance frequency determined in advance with the application of the magnetic field MF. In a case where the internal capacitor 80 has capacitance enough to realize the resonance frequency required for the cartridge memory 19 used in the magnetic tape cartridge 10, the capacitor 54 is not needed. The resonance frequency determined in advance is a frequency (for example, 13.56 MHz) corresponding to a frequency of the magnetic field MF, and should be suitably decided based on the specification or the like of the cartridge memory 19 and/or the noncontact reading and writing device 50. The capacitance of the capacitor 54 is determined based on a measured value of the capacitance of the internal capacitor 80. Here, although a form example where the capacitor 54 is externally attached has been described, the technique of the present disclosure is not limited thereto, and the capacitor 54 may be incorporated in advance into the IC chip 52.

The resonance circuit 92 generates an alternating-current power by generating a resonance phenomenon at the resonance frequency determined in advance using the induced current induced by the coil 60 with the magnetic field MF passing through the coil 60 and outputs the generated alternating-current power to the power supply circuit 82.

The power supply circuit 82 has a rectification circuit, a smoothing circuit, and the like. The rectification circuit is a full-wave rectification circuit having a plurality of diodes. The full-wave rectification circuit is merely an example, and a half-wave rectification circuit may be used. The smoothing circuit includes a capacitor and a resistor. The power supply circuit 82 converts the alternating-current power input from the resonance circuit 92 into direct-current power and supplies the converted direct-current power (hereinafter, simply referred to as "power") to various drive elements in the IC chip 52. Examples of various drive elements include the computer 84, the clock signal generator 86, and the signal processing circuit 88. In this way, power is supplied to various drive elements in the IC chip 52 by the power generator 70, whereby the IC chip 52 operates using power generated by the power generator 70.

The computer 84 controls the operation of the entire cartridge memory 19. The clock signal generator 86 generates a clock signal and outputs the clock signal to the signal processing circuit 88 and the like. The signal processing circuit 88 and the like operate conforming to the clock signal input from the clock signal generator 86. The clock signal generator 86 changes a frequency of the clock signal conforming to an instruction of the computer 84.

The signal processing circuit 88 is connected to the resonance circuit 92. The signal processing circuit 88 has a decoding circuit (not shown) and an encoding circuit (not shown). The decoding circuit of the signal processing circuit 88 extracts and decodes a command signal from the magnetic field MF received by the coil 60 and outputs the command signal to the computer 84. The computer 84 outputs a response signal to the command signal to the signal processing circuit 88. That is, the computer 84 executes processing according to the command signal input from the signal processing circuit 88 and outputs a processing result as a response signal to the signal processing circuit 88. In a case where the response signal is input from the computer 84, the encoding circuit of the signal processing circuit 88 encodes the response signal to modulate the response signal and outputs the response signal to the resonance circuit 92. The resonance circuit 92 transmits the response signal input from the encoding circuit of the signal processing circuit 88 to the noncontact reading and writing device 50 through the magnetic field MF.

Figure 10:
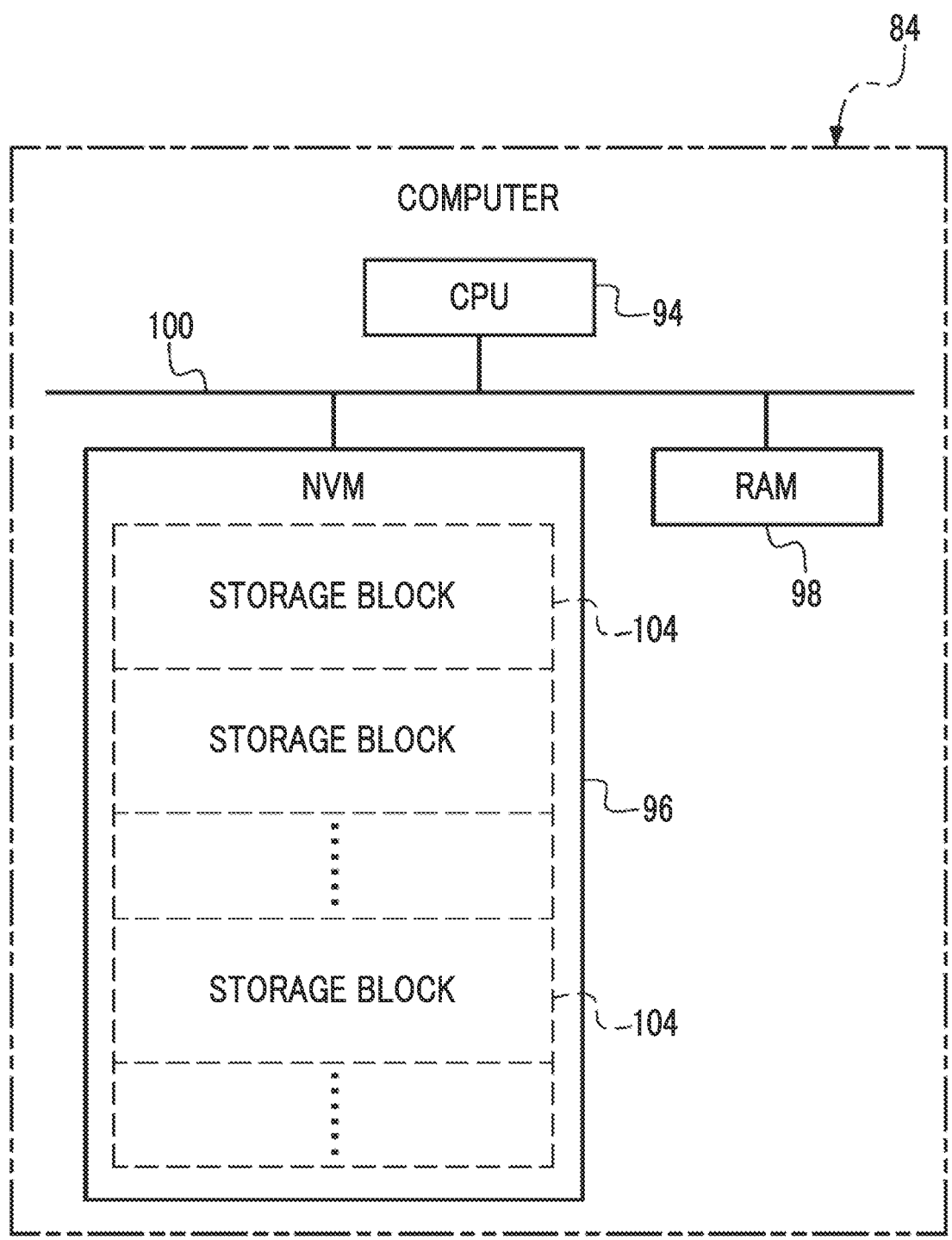
FIG. 10 is a block diagram showing an example of the hardware configuration of a computer of an IC chip mounted on the cartridge memory in the magnetic tape cartridge.

As shown in FIG. 10 as an example, the computer 84 comprises a CPU 94, an NVM 96, and a RAM 98. The CPU 94, the NVM 96, and the RAM 98 are connected to a bus 100.

The CPU 94 controls the operation of the computer 84. The NVM 96 is an example of a "storage medium" and an "internal memory" according to the technique of the present disclosure. An example of the NVM 96 is an EEPROM. The EEPROM is merely an example, and for example, a ferroelectric memory may be used instead of the EEPROM or any memory may be used as long as the memory is a nonvolatile memory that can be mounted on the IC chip 52. The NVM 96 has a plurality of storage blocks 104. Management information and the like are stored in a plurality of storage blocks 104. The RAM 98 temporarily stores various kinds of information and is used as a work memory. An example of the RAM 98 is a DRAM or an SRAM.

The CPU 94 selectively executes polling processing, read-out processing, write-in processing, locking processing, and the like in response to the command signal input from the signal processing circuit 88. The polling processing is processing of establishing communication with the noncontact reading and writing device 50, and is executed, for example, as preparation processing in a pre-stage of the read-out processing and the write-in processing. The read-out processing is processing of reading out the management information and the like from the NVM 96. The write-in processing is processing of writing the management information and the like into the NVM 96. The locking processing is processing of locking the storage block 104, in other words, processing of disabling rewriting of information stored in the storage block 104. Here, a meaning of "rewriting of information" also includes a meaning of "erasure of information".

Figure 11:
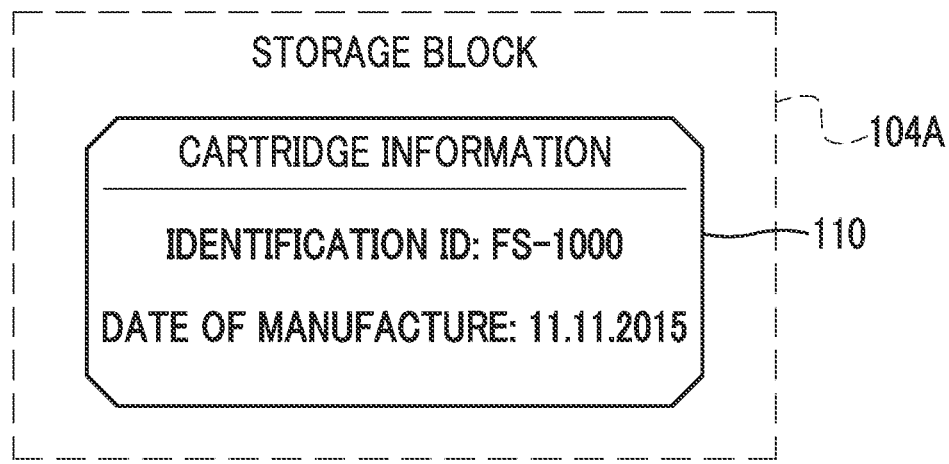
FIG. 11 is a diagram showing an example of storage block where cartridge information is stored.

As shown in FIG. 11 as an example, cartridge information 110 is stored in a storage block 104A that is one of a plurality of storage blocks 104. The cartridge information 110 includes an identification ID for uniquely identifying the type of the magnetic tape cartridge 10, and a date of manufacture of the magnetic tape MT. The identification ID is, for example, a combination of alphabets, such as "FS", representing a manufacturer of the magnetic tape cartridge 10, and numerals, such as "1000" representing a serial number or a model number of the magnetic tape cartridge 10.

Figure 12:
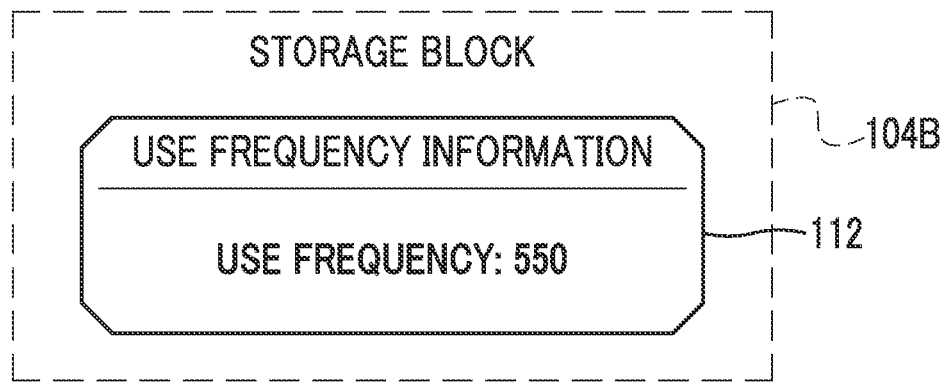
FIG. 12 is a diagram showing an example of a storage block where use frequency information is stored.

As shown in FIG. 12 as an example, use frequency information 112 is stored in a storage block 104B different from the storage block 104A. The use frequency information 112 includes a use frequency of the magnetic tape MT. The use frequency is incremented by the noncontact reading and writing device 50A each time the magnetic tape cartridge 10 is loaded in the magnetic tape drive 30 and the magnetic tape MT is used.

Figure 13:
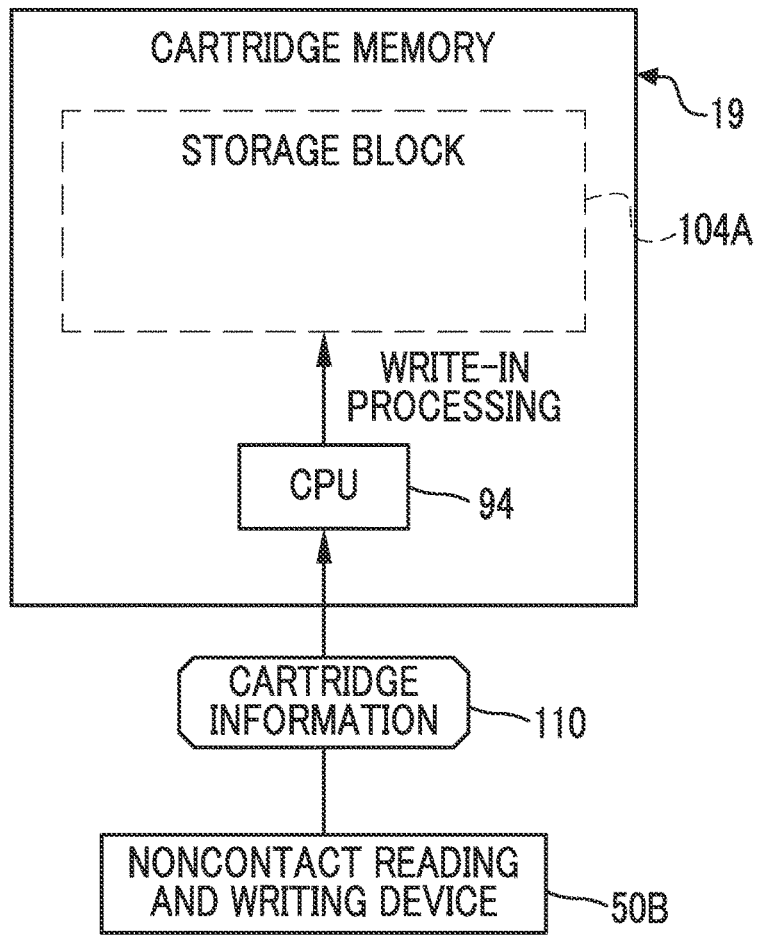
FIG. 13 is a diagram showing an aspect in which the cartridge information is written into the storage block.

As shown in FIG. 13 as an example, the noncontact reading and writing device 50B spatially transmits a write-in command of the cartridge information 110 as a command signal to the cartridge memory 19 at a timing of any one of a stage in which the magnetic tape cartridge 10 is manufactured, a stage in which the magnetic tape cartridge 10 is inspected, or a stage in which the magnetic tape cartridge 10 is shipped. The CPU 94 executes the write-in processing of storing the cartridge information 110 in the storage block 104A in response to the command signal from the noncontact reading and writing device 50B. With this, the cartridge information 110 is stored in the storage block 104A.

Figure 14:
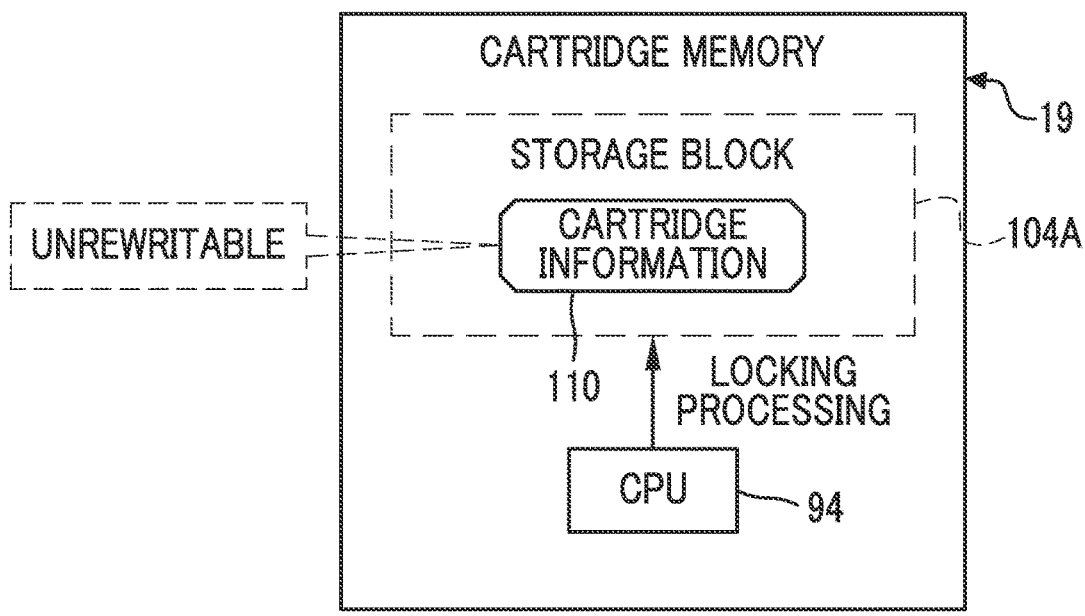
FIG. 14 is a diagram showing an example of an aspect in which locking processing is executed on the storage block where the cartridge information is stored.

As shown in FIG. 14 as an example, the CPU 94 executes the locking processing on the storage block 104A where the cartridge information 110 is stored. The locking processing is executed on the storage block 104A in this manner, whereby the cartridge information 110 is unrewritable. That is, the storage block 104A is an example of a "storage block where information is unrewritable" according to the technique of the present disclosure. The locking processing may be executed immediately after the cartridge information 110 is stored in the storage block 104A or may be executed in a case where the magnetic tape cartridge 10 is initially loaded in the magnetic tape drive 30 and the magnetic tape MT is initialized.

Figure 15:
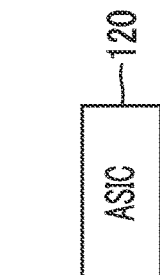
FIG. 15 is a block diagram showing an example of the detailed configuration of a control device.

As shown in FIG. 15 as an example, the control device 38 has an ASIC 120 and a storage 122. The ASIC 120 and the storage 122 are connected to a bus 124.

An information table 126 is stored in the storage 122. In the information table 126, an allowable range of temperature/humidity in using the magnetic tape MT corresponding to the identification ID of the cartridge information 110, an upper limit of a preservation period of the magnetic tape MT, and an upper limit of the use frequency of the magnetic tape MT are registered. The allowable range of the temperature/humidity is specifically upper and lower limit values (temperature lower limit and temperature upper limit) of a temperature, such as 16° C. and 32° C., and upper and lower limit values (humidity lower limit and humidity upper limit) of humidity, such as 20% and 80%. The upper limit of the preservation period is a numerical value that is represented by hours, such as 120000 hours. The upper limit of the use frequency is a numerical value that is represented by the number of times, such as 10000 times. The information table 126 is updated each time a new product of the magnetic tape cartridge 10 is released. The humidity stated herein is relative humidity.

The identification ID corresponds to the numerical value representing the allowable range of the temperature/humidity, the numerical value representing the upper limit of the preservation period, and the numerical value representing the upper limit of the use frequency. That is, the identification ID is an example of "temperature/humidity allowable range related information", "preservation period upper limit related information", and "use frequency upper limit related information" according to the technique of the present disclosure. The identification ID is an example of "first identification information", "second identification information", and "third identification information" according to the technique of the present disclosure.

The allowable range of the temperature/humidity is a range of temperature/humidity at which data recording and/or reading by the magnetic head 36 is performed without problems, and is a range obtained by a computer simulation and/or a test with a real machine. Similarly, the upper limit of the preservation period and the upper limit of the use frequency are the upper limit of the preservation period and the upper limit of the use frequency at which data recording and/or reading by the magnetic head 36 is performed without problems, and values obtained by a computer simulation and/or a test with a real machine.

Figure 16:
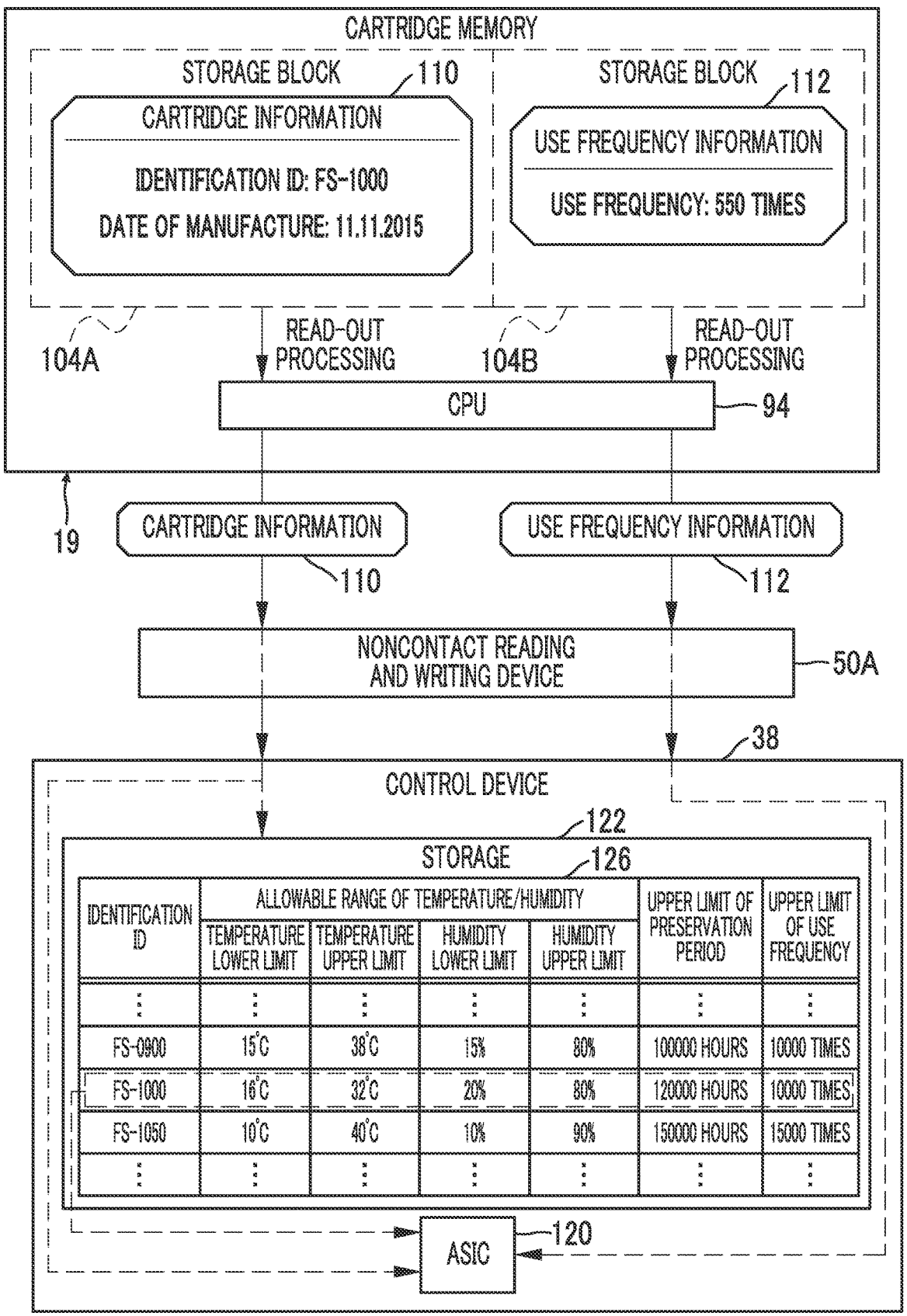
FIG. 16 showing an example of a manner in which the cartridge information is read out from the storage block, an allowable range of temperature/humidity, an upper limit of a preservation period, and an upper limit of a use frequency corresponding to the cartridge information are input to an ASIC.

As shown in FIG. 16 as an example, the noncontact reading and writing device 50A spatially transmits a read-out command of the cartridge information 110 and the use frequency information 112 as a command signal to the cartridge memory 19 at a timing at which the magnetic tape cartridge 10 is loaded in the magnetic tape drive 30. The CPU 94 executes read-out processing of reading out the cartridge information 110 from the storage block 104A and read-out processing of reading out the use frequency information 112 from the storage block 104B in response to the command signal from the noncontact reading and writing device 50A. Then, the CPU 94 spatially transmits the read-out cartridge information 110 and use frequency information 112 as a response signal to the noncontact reading and writing device 50A. The noncontact reading and writing device 50A is an example of a "read-out device" according to the technique of the present disclosure. The noncontact reading and writing device 50A, the magnetic tape cartridge 10, the control device 38, and the like configure a magnetic tape system 51 (see FIG. 4).

The noncontact reading and writing device 50A outputs the cartridge information 110 and the use frequency information 112 from the cartridge memory 19 to the control device 38. The ASIC 120 of the control device 38 reads out the allowable range of the temperature/humidity, the upper limit of the preservation period, and the upper limit of the use frequency from the information table 126 corresponding to the identification ID of the cartridge information 110. The cartridge information 110 and the use frequency information 112 from the cartridge memory 19 are input to the ASIC 120.

FIG. 16 illustrates a case where "FS-1000" is stored in the identification ID of the cartridge information 110. In this case, the ASIC 120 reads out 16° C. and 32° C., and 20% and 80% as the allowable range of the temperature/humidity, 120000 hours as the upper limit of the preservation period, and 10000 times as the upper limit of the use frequency corresponding to the identification ID "FS-1000" from the information table 126. In FIG. 16, the bus 124 is not shown.

Figure 17:
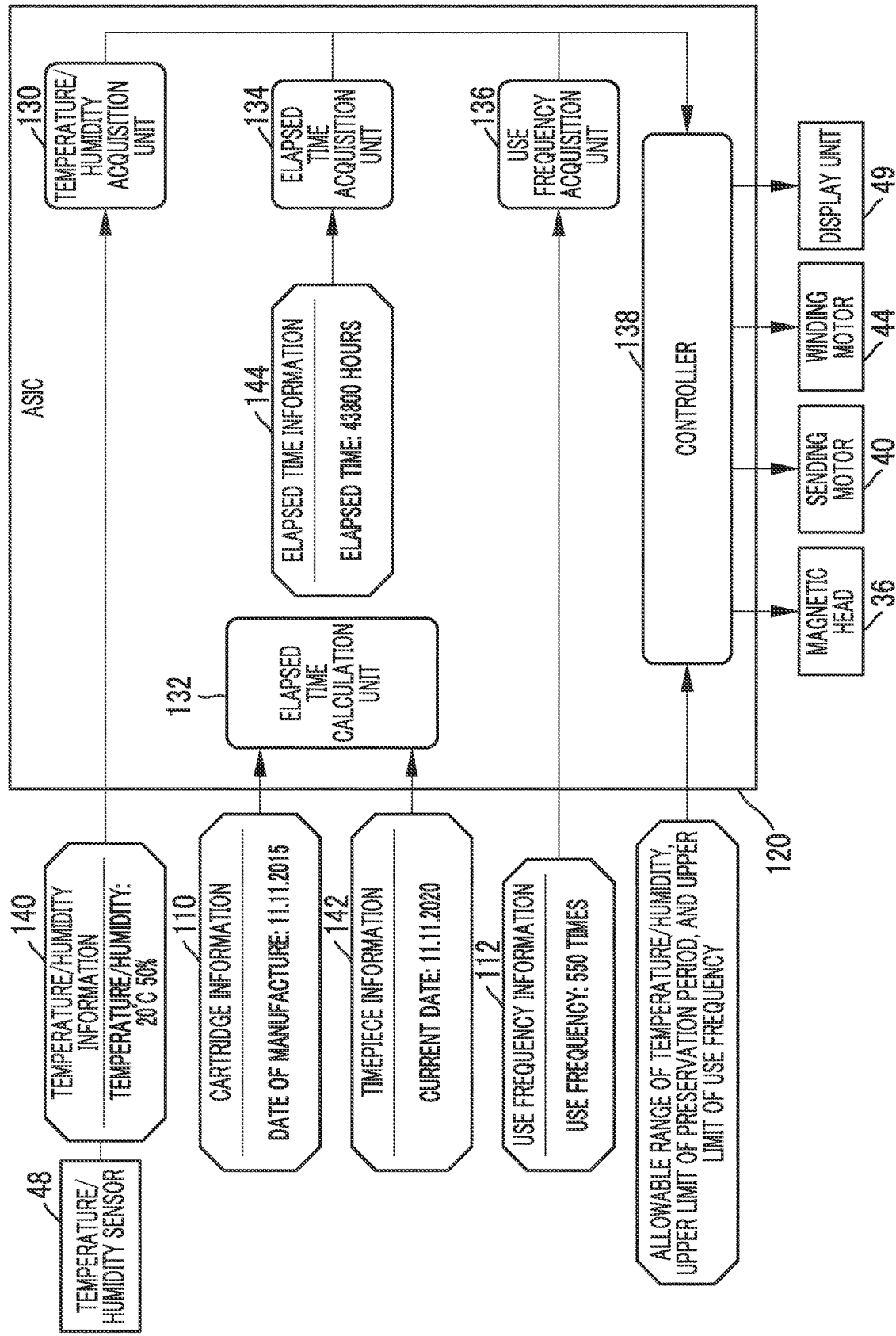
FIG. 17 is a block diagram showing an example of the detailed configuration of an ASIC.

As shown in FIG. 17 as an example, the ASIC 120 functions as a temperature/humidity acquisition unit 130, an elapsed time calculation unit 132, an elapsed time acquisition unit 134, a use frequency acquisition unit 136, and a controller 138.

The temperature/humidity acquisition unit 130 acquires temperature/humidity information 140 as information regarding the temperature/humidity detected by the temperature/humidity sensor 48. The temperature/humidity acquisition unit 130 outputs the acquired temperature/humidity information 140 to the controller 138.

The cartridge information 110 and timepiece information 142 are input to the elapsed time calculation unit 132. The timepiece information 142 includes a current date timed by a timepiece function incorporated in the control device 38. The elapsed time calculation unit 132 calculates an elapsed time from the date of manufacture of the magnetic tape cartridge 10 from the date of manufacture of the magnetic tape cartridge 10 included in the cartridge information 110 and the current date included in the timepiece information 142. The elapsed time calculation unit 132 outputs elapsed time information 144 as information regarding the calculated elapsed time to the elapsed time acquisition unit 134. The elapsed time acquisition unit 134 acquires the elapsed time information 144 from the elapsed time calculation unit 132. The elapsed time acquisition unit 134 outputs the acquired elapsed time information 144 to the controller 138. FIG. 17 illustrates a case where the date of manufacture of the magnetic tape cartridge 10 is 2015.11.11, the current date is 2020.11.11, and the elapsed time is 43800 hours (=5 years). In FIG. 17, the identification ID of the cartridge information 110 is not shown.

The use frequency acquisition unit 136 acquires the use frequency information 112. The use frequency acquisition unit 136 outputs the acquired use frequency information 112 to the controller 138.

The controller 138 controls the operations of the magnetic head 36, the sending motor 40, the winding motor 44, and the display unit 49 based on the temperature/humidity information 140 from the temperature/humidity acquisition unit 130, the elapsed time information 144 from the elapsed time acquisition unit 134, the use frequency information 112 from the use frequency acquisition unit 136, and the allowable range of the temperature/humidity, the upper limit of the preservation period, and the upper limit of the use frequency read out from the information table 126.

Figure 18:
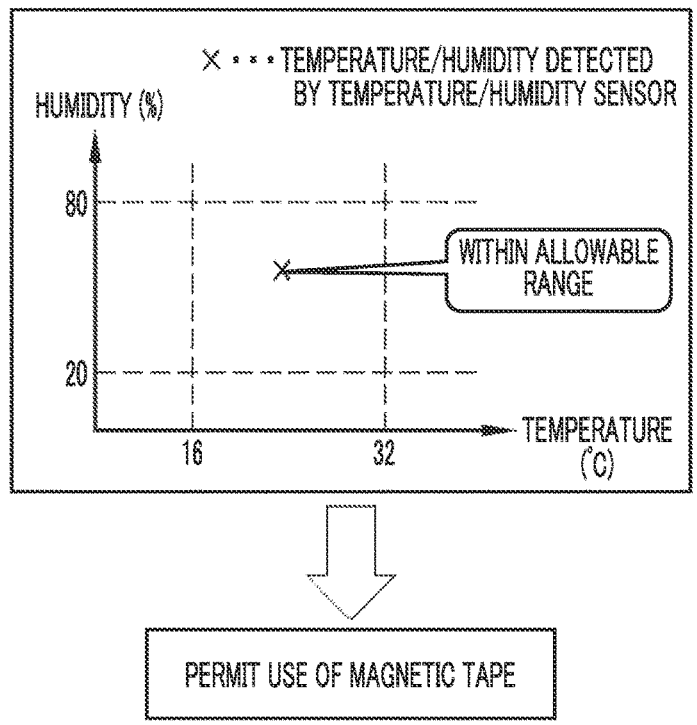
FIG. 18 is a diagram showing an example of control in a case where temperature/humidity detected by a temperature/humidity sensor is within the allowable range of the temperature/humidity.

As shown in FIG. 18 as an example, in a case where the temperature/humidity detected by the temperature/humidity sensor 48, that is, the temperature/humidity acquired as the temperature/humidity information 140 by the temperature/humidity acquisition unit 130 is within the allowable range of the temperature/humidity, the controller 138 performs control for permitting the use of the magnetic tape MT. Specifically, the controller 138 controls the operations of the sending motor 40 and the winding motor 44 to transport the magnetic tape MT toward the magnetic head 36. The controller 138 controls the operation of the magnetic head 36 to perform data recording onto the magnetic tape MT and/or data reading from the magnetic tape MT.

Figure 19:
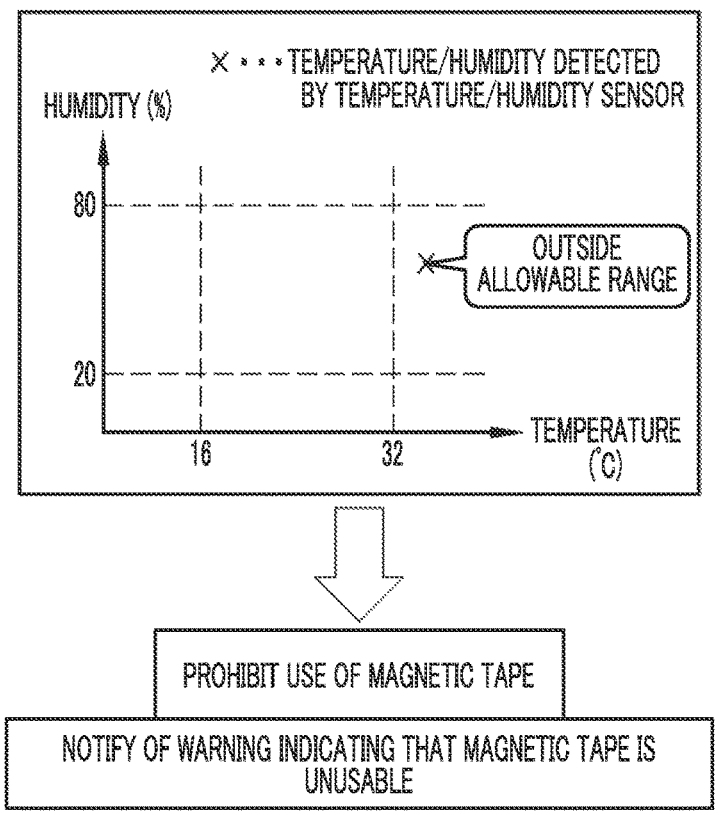
FIG. 19 is a diagram showing an example of control in a case where the temperature/humidity detected by the temperature/humidity sensor is outside the allowable range of the temperature/humidity.

In contrast, as shown in FIG. 19 as an example, in a case where the temperature/humidity detected by the temperature/humidity sensor 48, that is, the temperature/humidity acquired as the temperature/humidity information 140 by the temperature/humidity acquisition unit 130 is outside the allowable range of the temperature/humidity, the controller 138 performs control for prohibiting the use of the magnetic tape MT. Specifically, the controller 138 does not operate the sending motor 40 and the winding motor 44, and the magnetic head 36. The controller 138 displays a warning indicating that the magnetic tape MT is unusable, on the display unit 49. FIGS. 18 and 19 illustrate a case where the upper and lower limit values of the temperature are 16° C. and 32° C., and the upper and lower limit values of the humidity are 20% and 80%.

Figure 20:
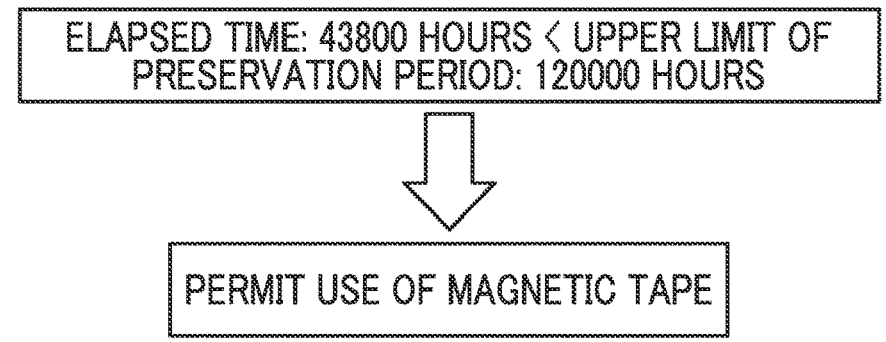
FIG. 20 is a diagram showing an example of control in a case where an elapsed time of a date of manufacture of the magnetic tape cartridge falls below the upper limit of the preservation period.
Figure 21:
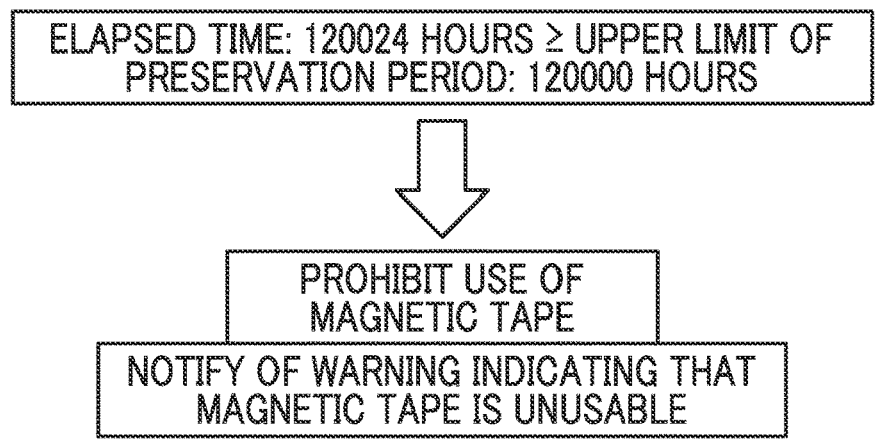
FIG. 21 is a diagram showing an example of control in a case where the elapsed time of the date of manufacture of the magnetic tape cartridge is equal to or greater than the upper limit of the preservation period.

As shown in FIG. 20 as an example, in a case where the elapsed time falls below the upper limit of the preservation period, as in the case of FIG. 18, the controller 138 performs control for permitting the use of the magnetic tape MT. In contrast, as shown in FIG. 21 as an example, in a case where the elapsed time is equal to or greater than the upper limit of the preservation period, as in the case of FIG. 19, the controller 138 performs control for prohibiting the use of the magnetic tape MT. The controller 138 displays a warning indicating that the magnetic tape MT is unusable, on the display unit 49. FIGS. 20 and 21 illustrate a case where the upper limit of the preservation period is 120000 hours.

Figure 22:
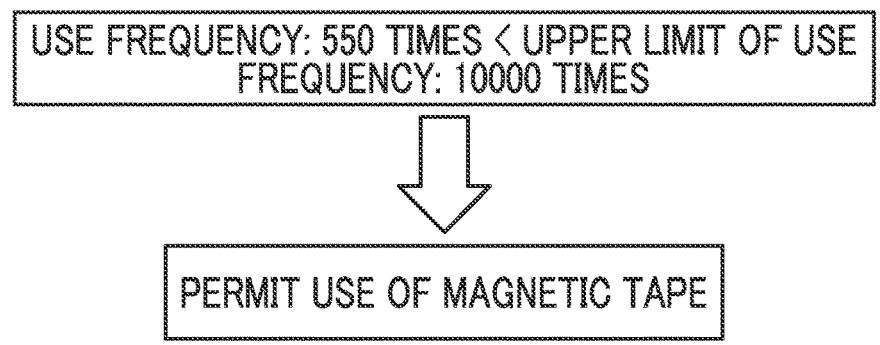
FIG. 22 is a diagram showing an example of control in a case where a previous use frequency of the magnetic tape falls below the upper limit of the use frequency.
Figure 23:
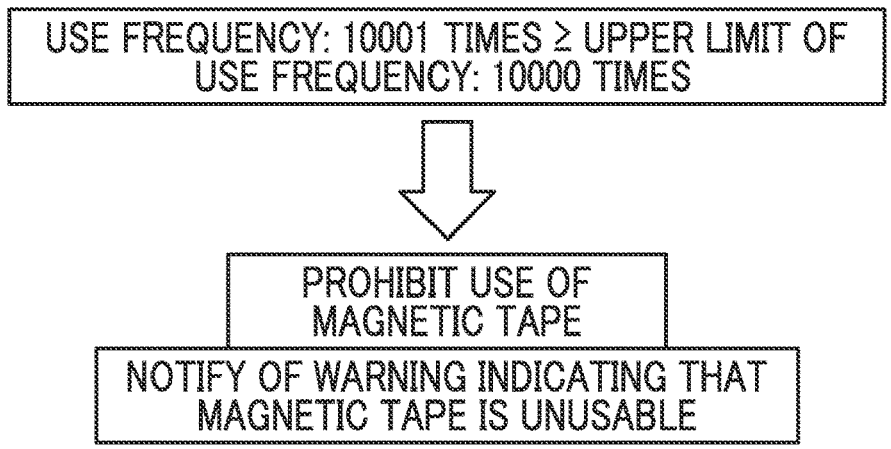
FIG. 23 is a diagram showing an example of control in a case where the previous use frequency of the magnetic tape is equal to or greater than the upper limit of the use frequency.

As shown in FIG. 22 as an example, in a case where a previous use frequency of the magnetic tape MT falls below the upper limit of the use frequency, as in the cases of FIGS. 18 and 20, the controller 138 performs control for permitting the use of the magnetic tape MT. In contrast, as shown in FIG. 23 as an example, in a case where the previous use frequency of the magnetic tape MT is equal to or greater than the upper limit of the use frequency, as in the cases of FIGS. 19 and 21, the controller 138 performs control for prohibiting the use of the magnetic tape MT. The controller 138 displays a warning indicating that the magnetic tape MT is unusable, on the display unit 49. FIGS. 22 and 23 illustrate a case where the upper limit of the use frequency is 10000 times.

As a method of warning display, for example, a method of displaying a message "Since the temperature/humidity is outside the allowable range, the magnetic tape cannot be used.", "Since the preservation period is passed, the magnetic tape cannot be used.", or "Since the upper limit of the use frequency is exceeded, the magnetic tape cannot be used." on the display unit 49 can be employed. A method of displaying characters, such as "NG" or "ERROR", on the display unit 49 to be blinked in red can also be employed. Alternatively, a warning may be notified using sound, such as beep, a warning lamp, or the like.

Figure 24:
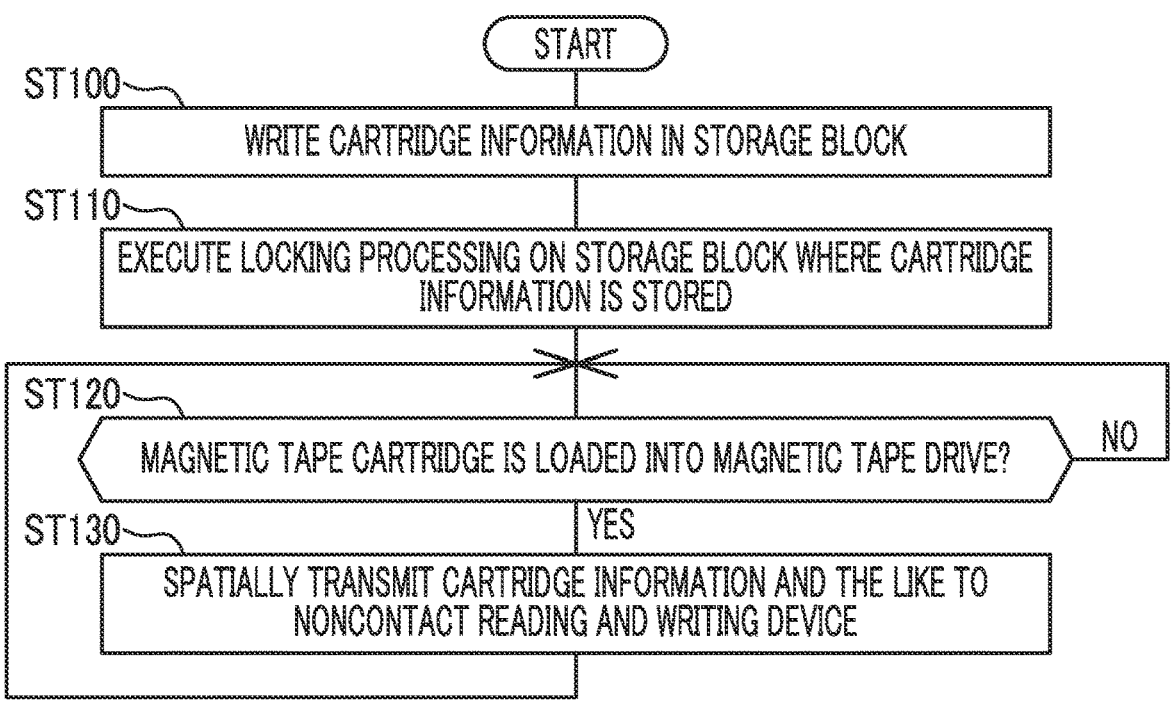
FIG. 24 is a flowchart illustrating an example of an operation procedure of a CPU of the cartridge memory.

Next, the operations of the above-described configuration will be described referring to flowcharts of FIGS. 24 and 25. First, as shown in FIG. 24 as an example, as shown in FIG. 13, the CPU 94 writes the cartridge information 110 from the noncontact reading and writing device 50B into the storage block 104A of the cartridge memory 19 at a timing of any one of a stage in which the magnetic tape cartridge 10 is manufactured, a stage in which the magnetic tape cartridge 10 is inspected, or a stage in which the magnetic tape cartridge 10 is shipped (Step ST100). Next, as shown in FIG. 14, the CPU 94 executes the locking processing is executed on the storage block 104A where the cartridge information 110 is stored (Step ST110). With this, the cartridge information 110 is unrewritable.

At a timing at which the magnetic tape cartridge 10 is loaded in the magnetic tape drive 30 (in Step ST120, YES), as shown in FIG. 16, the CPU 94 reads out the cartridge information 110 is read out from the storage block 104A and the use frequency information 112 from the storage block 104B. Then, the CPU 94 spatially transmits the cartridge information 110 and the use frequency information 112 to the noncontact reading and writing device 50A (Step ST130).

Figure 25:
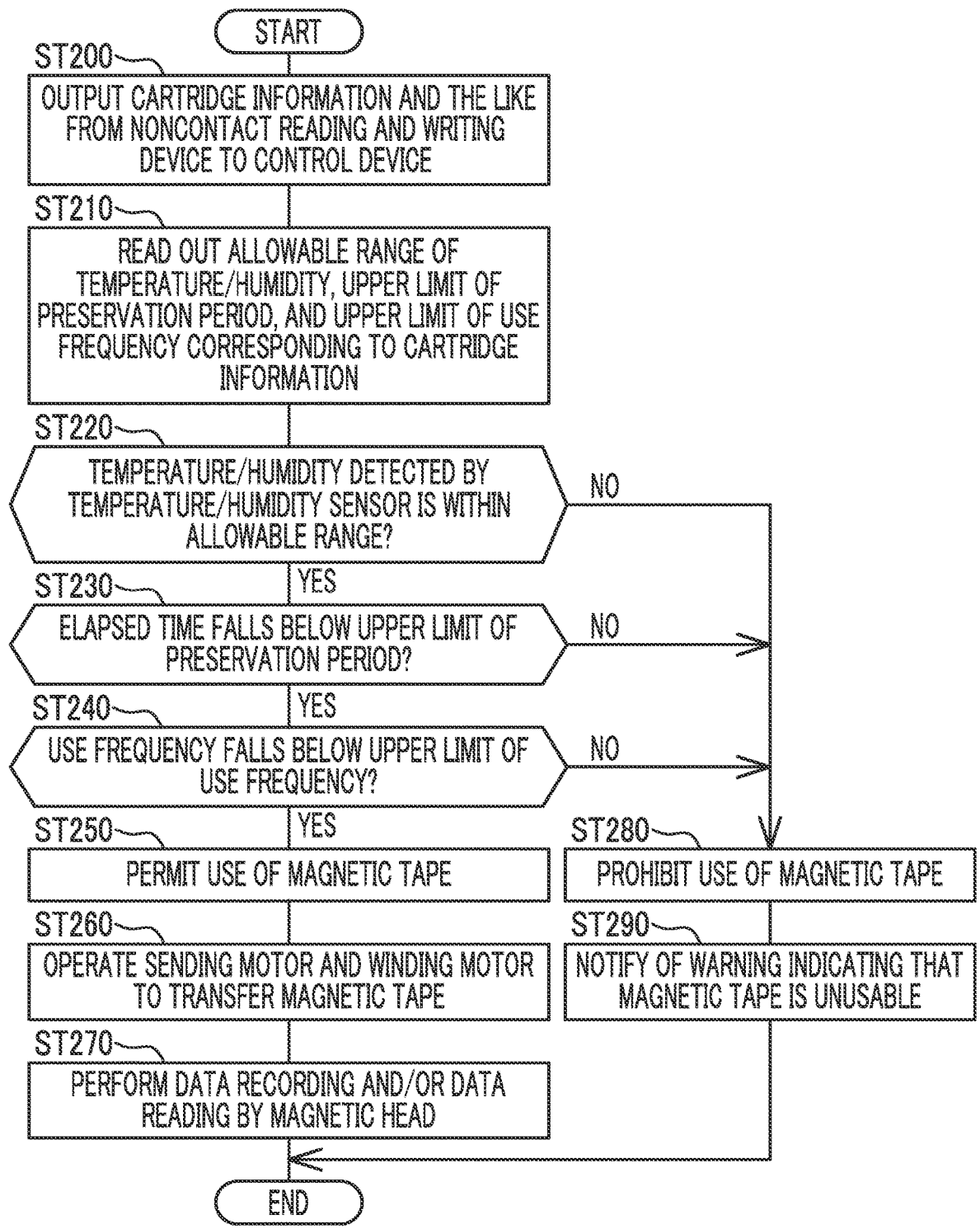
FIG. 25 is a flowchart illustrating an example of an operation procedure of the magnetic tape drive.

As shown in FIG. 25 as an example, the cartridge information 110 and the use frequency information 112 are output from the noncontact reading and writing device 50A to the control device 38 as shown in FIG. 16 (Step ST200). Subsequently, the ASIC 120 reads out the allowable range of the temperature/humidity, the upper limit of the preservation period, and the upper limit of the use frequency corresponding to the identification ID of the cartridge information 110 from the information table 126 (Step ST210).

As shown in FIG. 17, in the ASIC 120, the temperature/humidity acquisition unit 130 acquires the temperature/humidity information 140 from the temperature/humidity sensor 48. The elapsed time calculation unit 132 calculates the elapsed time based on the cartridge information 110 and the timepiece information 142, and outputs the elapsed time information 144 as a calculation result to the elapsed time acquisition unit 134. The use frequency acquisition unit 136 acquires the use frequency information 112. The temperature/humidity information 140, the elapsed time information 144, and the use frequency information 112 are output to the controller 138.

In a case where the temperature/humidity detected by the temperature/humidity sensor 48 is within the allowable range of the temperature/humidity, the elapsed time falls below the upper limit of the preservation period, and the previous use frequency of the magnetic tape MT falls below the upper limit of the use frequency (in all of Steps ST220, ST230, and ST240, YES), the controller 138 permits the use of the magnetic tape MT (Step ST250). Specifically, the sending motor 40 and the winding motor 44 are rotated under the control of the controller 138, and the magnetic tape MT is transported in the forward direction or the backward direction (Step ST260). The magnetic head 36 is operated under the control of the controller 138, and data is recorded onto the running magnetic tape MT or data recorded on the running magnetic tape MT is read (Step ST270).

In a case where the temperature/humidity detected by the temperature/humidity sensor 48 is outside the allowable range of the temperature/humidity (in Step ST220, NO), a case where the elapsed time is equal to or greater than the upper limit of the preservation period (in Step ST230, NO), and a case where the previous use frequency of the magnetic tape MT is equal to or greater than the upper limit of the use frequency (in Step ST240, NO), the controller 138 prohibits the use of the magnetic tape MT (Step ST280). A warning indicating that the magnetic tape MT is unusable is displayed on the display unit 49 under the control of the controller 138 (Step ST290).

As described above, the magnetic tape cartridge 10 comprises the case 12 in which the magnetic tape MT is housed, and the NVM 96 of the cartridge memory 19 provided in the case 12. The NVM 96 stores the cartridge information 110 including the identification ID regarding the allowable range of the temperature/humidity in using the magnetic tape MT, the upper limit of the preservation period of the magnetic tape MT, and the upper limit of the use frequency of the magnetic tape MT. Accordingly, it is possible to obtain information for appropriately controlling the magnetic tape MT.

As shown in FIG. 15, the identification ID corresponds to the numerical value representing the allowable range of the temperature/humidity, the numerical value representing the upper limit of the preservation period, and the numerical value representing the upper limit of the use frequency. For this reason, it is possible to increase the confidentiality of the numerical values compared to a case where the numerical value itself representing the allowable range of the temperature/humidity, the numerical value itself representing the upper limit of the preservation period, and the numerical value itself representing the upper limit of the use frequency are stored in the NVM 96.

In the embodiment, the NVM 96 is used as the storage medium. The NVM 96 is incorporated in the cartridge memory 19 where reading-out and writing-in of information are performed by the noncontact reading and writing device 50. For this reason, it is possible to simply perform reading-out and writing-in of the cartridge information 110, and consequently, the identification ID.

The cartridge information 110, and consequently, the identification ID are stored in the storage block 104A where information is unrewritable. For this reason, it is possible to prevent improvident rewriting of the identification ID.

The magnetic tape drive 30 comprises the noncontact reading and writing device 50A that reads out the cartridge information 110 including the identification ID stored in the NVM 96 of the cartridge memory 19, the temperature/humidity acquisition unit 130 that acquires the temperature/humidity detected by the temperature/humidity sensor 48, the elapsed time acquisition unit 134 that acquires the elapsed time from the date of manufacture of the loaded magnetic tape cartridge 10, and the use frequency acquisition unit 136 that acquires the previous use frequency of the magnetic tape MT housed in the loaded magnetic tape cartridge 10. The magnetic tape drive 30 comprises the controller 138 that performs control based on the temperature/humidity acquired by the temperature/humidity acquisition unit 130 and the allowable range of the temperature/humidity, the elapsed time acquired by the elapsed time acquisition unit 134 and the upper limit of the preservation period, and the use frequency acquired by the use frequency acquisition unit 136 and the upper limit of the use frequency. For this reason, it is possible to appropriately control the magnetic tape MT.

As shown in FIGS. 18, 20, and 22, the controller 138 performs control for permitting the use of the magnetic tape MT in a case where the temperature/humidity acquired by the temperature/humidity acquisition unit 130 is within the allowable range of the temperature/humidity, a case where the elapsed time acquired by the elapsed time acquisition unit 134 falls below the upper limit of the preservation period, and a case where the use frequency acquired by the use frequency acquisition unit 136 falls below the upper limit of the use frequency. In contrast, as shown in FIGS. 19, 21, and 23, the controller 138 performs control for prohibiting the use of the magnetic tape MT and control for notifying of a warning indicating that the magnetic tape MT is unusable in a case where the temperature/humidity acquired by the temperature/humidity acquisition unit 130 is outside the allowable range of the temperature/humidity, a case where the elapsed time acquired by the elapsed time acquisition unit 134 is equal to or greater than the upper limit of the preservation period, and a case where the use frequency acquired by the use frequency acquisition unit 136 is equal to or greater than the upper limit of the use frequency. Accordingly, it is possible to reduce a concern that recording of data onto the magnetic tape MT and/or reading of data recorded on the magnetic tape MT is hindered.

The magnetic tape system 51 comprises the magnetic tape cartridge 10, the noncontact reading and writing device 50A that reads out the cartridge information 110 including the identification ID stored in the NVM 96 of the cartridge memory 19, and the control device 38 that performs control based on the temperature/humidity detected by the temperature/humidity sensor 48 and the allowable range of the temperature/humidity, the elapsed time from the date of manufacture of the loaded magnetic tape cartridge 10 and the upper limit of the preservation period, and the previous use frequency of the magnetic tape MT housed in the loaded magnetic tape cartridge 10 and the upper limit of the use frequency. For this reason, it is possible to appropriately control the magnetic tape MT.

As shown in FIGS. 18, 20, and 22, the control device 38 performs control for permitting the use of the magnetic tape MT in a case where the temperature/humidity detected by the temperature/humidity sensor 48 is within the allowable range of the temperature/humidity, a case where the elapsed time falls below the upper limit of the preservation period, and a case where the use frequency falls below the upper limit of the use frequency. In contrast, as shown in FIGS. 19, 21, and 23, the control device 38 performs control for prohibiting the use of the magnetic tape MT and control for notifying of a warning indicating that the magnetic tape MT is unusable in a case where the temperature/humidity detected by the temperature/humidity sensor 48 is outside the allowable range of the temperature/humidity, a case where the elapsed time is equal to or greater than the upper limit of the preservation period, and a case where the use frequency is equal to or greater than the upper limit of the use frequency. Accordingly, it is possible to reduce a concern that recording of data onto the magnetic tape MT and/or reading of data recorded on the magnetic tape MT is hindered.

An expression method of the allowable range of the temperature/humidity is not limited to the illustrated upper and lower limit values. A pair of a median value of the allowable range and a difference of the upper and lower limit values of the allowable range with respect to the median value may be employed. For example, in a case where the allowable range of the temperature meets 16° C. to 32° C., the allowable range is expressed by a median value 24° C. and a different ±8° C.

Figure 26:
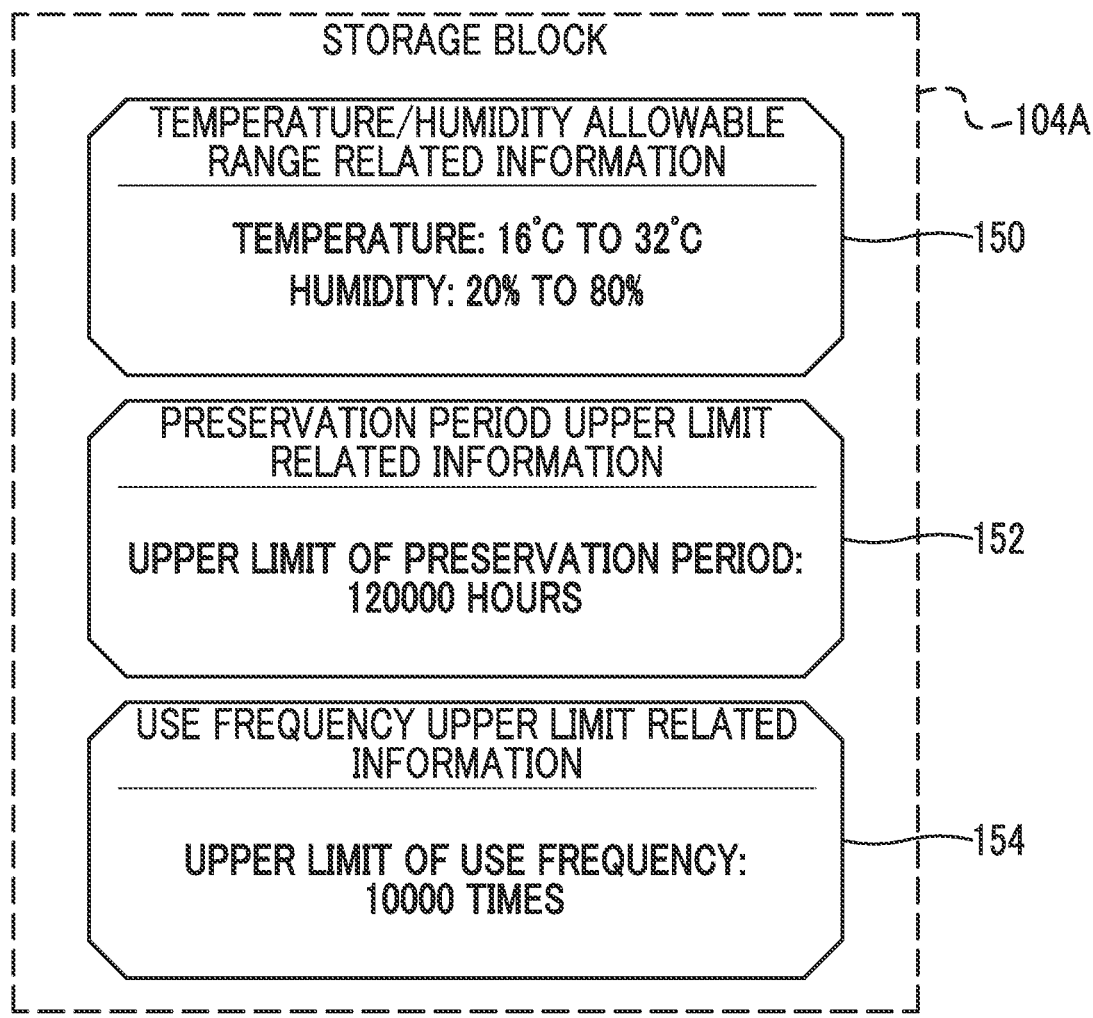
FIG. 26 is a diagram showing another example of temperature/humidity allowable range related information, preservation period upper limit related information, and use frequency upper limit related information.

The temperature/humidity allowable range related information, the preservation period upper limit related information, and the use frequency upper limit related information are limited to the illustrated identification ID. As shown in temperature/humidity allowable range related information 150, preservation period upper limit related information 152, and use frequency upper limit related information 154 of FIG. 26 as an example, the numerical value itself representing the allowable range of the temperature/humidity, the numerical value itself representing the upper limit of the preservation period, and the numerical value itself representing the upper limit of the use frequency may be employed. Then, the information table 126 does not need to be prepared in the storage 122 of the control device 38.

Second Embodiment

Figure 28:
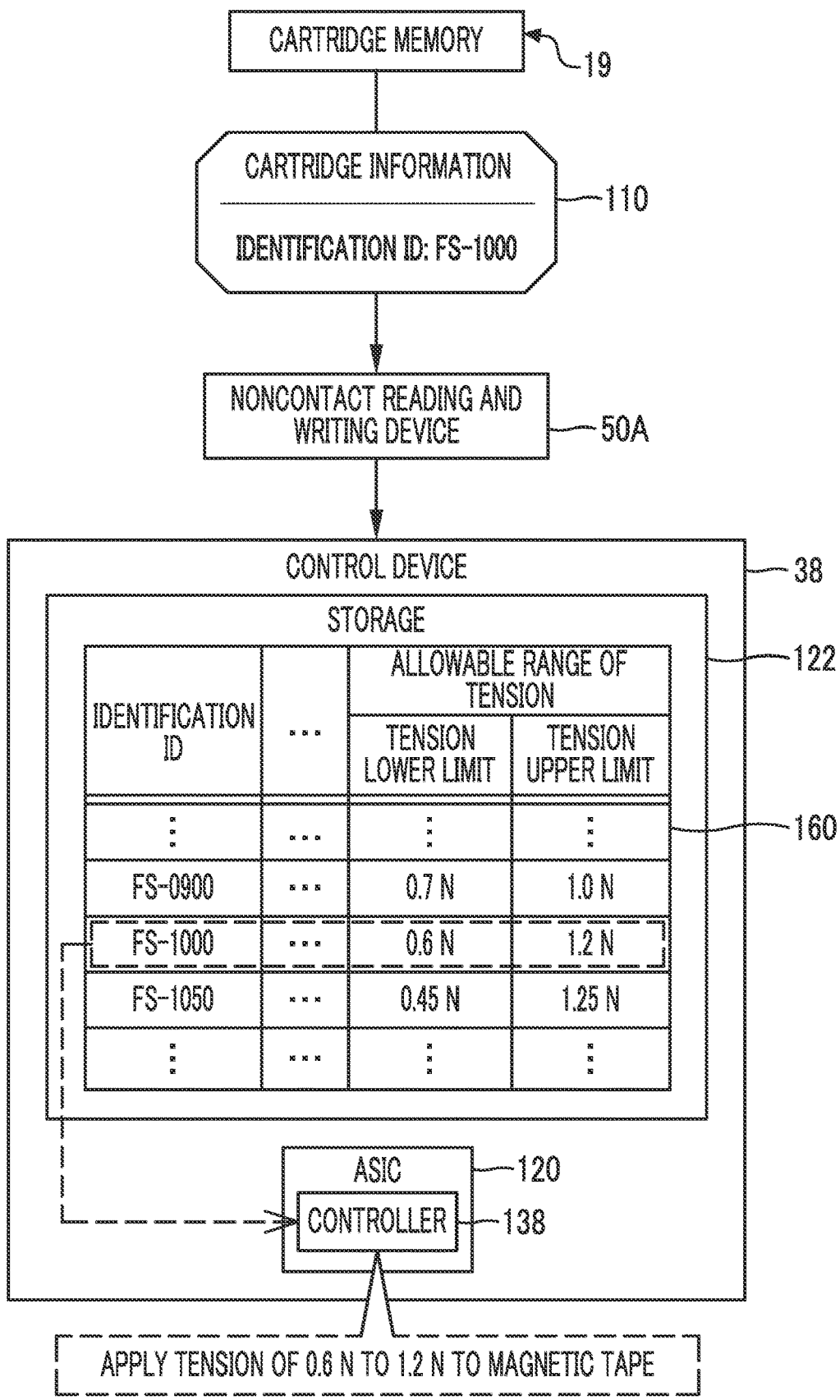
FIG. 28 is a diagram showing an example of an aspect in which tension allowable range related information is read out from the storage block and tension within the allowable range represented by the read-out tension allowable range related information is applied to the magnetic tape.
Figure 29:
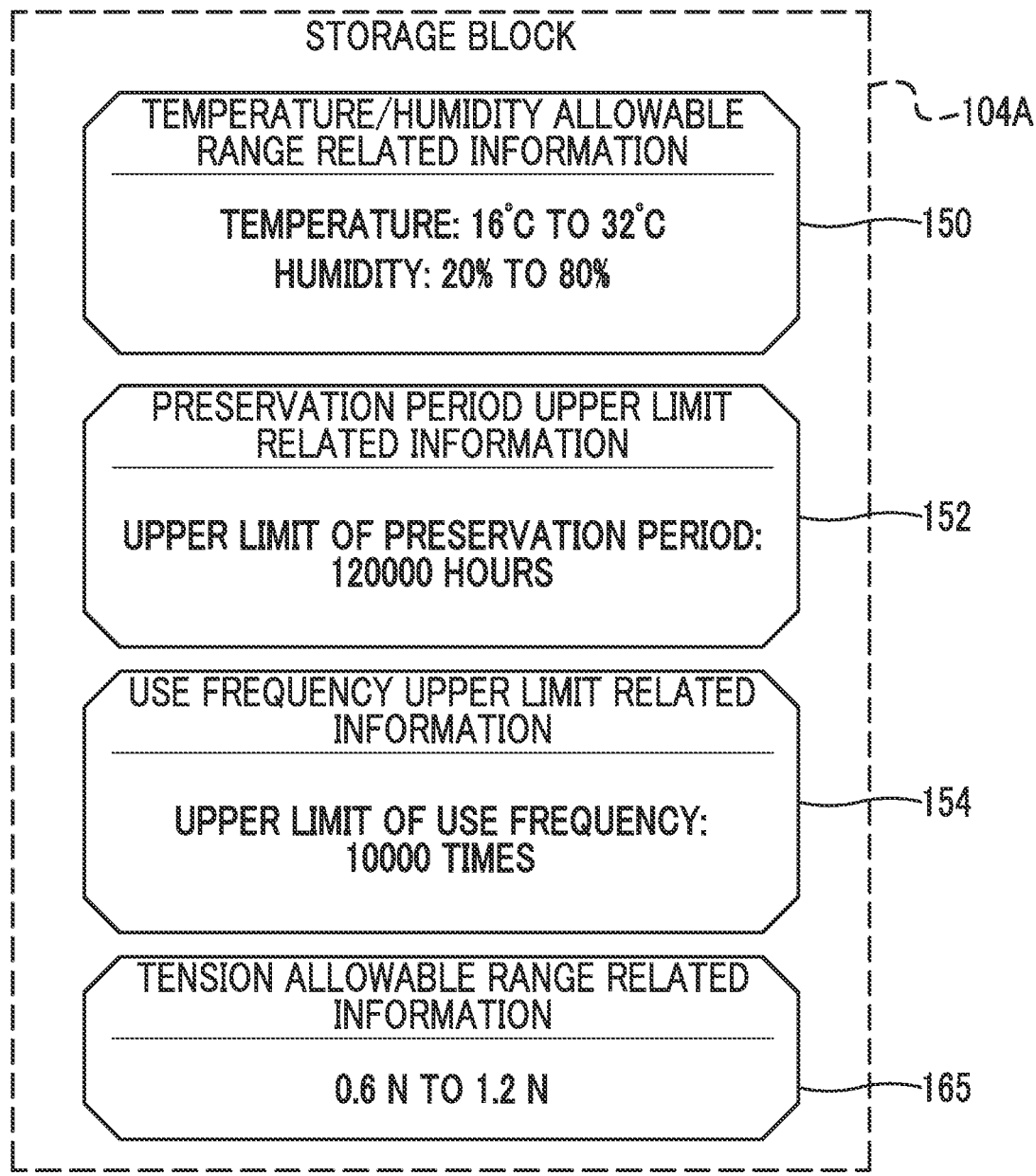
FIG. 29 is a diagram showing another example of the temperature/humidity allowable range related information, the preservation period upper limit related information, the use frequency upper limit related information, and the tension allowable range related information.

In a second embodiment shown in FIGS. 27 to 29, tension allowable range related information regarding an allowable range of tension applied to the magnetic tape MT is also stored.

As shown in FIG. 27 as an example, in an information table 160 of the second embodiment, the allowable range of the tension is registered for each identification ID, in addition to the allowable range of the temperature/humidity, the upper limit of the preservation period, and the upper limit of the use frequency. The allowable range of the tension is specifically upper and lower limit values (tension lower limit and tension upper limit) of tension, such as 0.6 N and 1.2 N. In this case, the identification ID corresponds to a numerical value representing the allowable range of the tension, in addition to the numerical value representing the allowable range of the temperature/humidity, the numerical value representing the upper limit of the preservation period, and the numerical value representing the upper limit of the use frequency. That is, the identification ID is an example of "tension allowable range related information" according to the technique of the present disclosure. The identification ID is an example of "fourth identification information" according to the technique of the present disclosure.

As shown in FIG. 28 as an example, the ASIC 120 of the control device 38 reads out the allowable range of the temperature/humidity, the upper limit of the preservation period, the upper limit of the use frequency, and the allowable range of the tension corresponding to the identification ID of the cartridge information 110 from the information table 160. The allowable range of the temperature/humidity, the upper limit of the preservation period, the upper limit of the use frequency, and the allowable range of the tension are input to the controller 138. The controller 138 controls the operations of the sending motor 40 and the winding motor 44 to apply tension within the allowable range to the magnetic tape MT. The controller 138 applies, for example, tension of a median value of the allowable range to the magnetic tape MT.

FIG. 28 illustrates a case where "FS-1000" is stored in the identification ID of the cartridge information 110. In this case, the ASIC 120 reads out 0.6 N and 1.2 N as the upper and lower limit values the allowable range of the tension corresponding to the identification ID "FS-1000" from the information table 160. The controller 138 controls the operations of the sending motor 40 and the winding motor 44 to apply tension within 0.6 N to 1.2 N, for example, tension of 0.9 N as a median value of 0.6 N to 1.2 N to the magnetic tape MT. In FIG. 28, the bus 124 is not shown as in FIG. 16. In FIG. 28, the date of manufacture of the cartridge information 110 is not shown. In addition, the allowable range of the temperature/humidity, the upper limit of the preservation period, and the upper limit of the use frequency of the information table 160 are not shown.

In this way, in the second embodiment, the tension allowable range related information regarding the allowable range of the tension applied to the magnetic tape MT is also stored. Accordingly, it is possible to obtain information regarding the allowable range of the tension applied to the magnetic tape MT, in addition to the allowable range of the temperature/humidity, the upper limit of the preservation period, and the upper limit of the use frequency.

The controller 138 controls the operations of the sending motor 40 and the winding motor 44 to apply tension within the allowable range represented by the tension allowable range related information to the magnetic tape MT. For this reason, there is no concern that tension exceeding the upper limit value of the allowable range is applied to the magnetic tape MT, and irreversible damage, such as plastic deformation, is given to the magnetic tape MT. Furthermore, there is no concern that tension below the lower limit value of the allowable range is applied to the magnetic tape MT, and the running magnetic tape MT is flapped. Accordingly, it is possible to perform stable recording of data onto the magnetic tape MT and/or reading of data recorded on the magnetic tape MT.

The identification ID corresponds to the numerical value representing the allowable range of the tension, in addition to the numerical value representing the allowable range of the temperature/humidity, the numerical value representing the upper limit of the preservation period, and the numerical value representing the upper limit of the use frequency. For this reason, it is possible to increase the confidentiality of the numerical value representing the allowable range of the tension compared to a case where the numerical value itself representing the allowable range of the tension is stored in the NVM 96.

An expression method of the allowable range of the tension is not limited to the illustrated upper and lower limit values as in the case of the allowable range of the temperature/humidity. A pair of a median value of the allowable range and a difference of the upper and lower limit values of the allowable range with respect to the median value may be employed. For example, in a case where the allowable range of the tension meets 0.6 N to 1.2 N, the allowable range is expressed by a median value 0.9 N and a difference ±0.3 N.

The tension allowable range related information is not limited to the illustrated identification ID as in the case of the temperature/humidity allowable range related information, the preservation period upper limit related information, and the use frequency upper limit related information. As tension allowable range related information 165 of FIG. 29 as an example, the numerical value itself representing the allowable range of the tension may be employed. Then, the information table 160 does not need to be prepared in the storage 122 of the control device 38.

Third Embodiment

In the above-described embodiments, although the NVM 96 of the cartridge memory 19 is illustrated as the storage medium, the technique of the present disclosure is not limited thereto.

Figure 30:
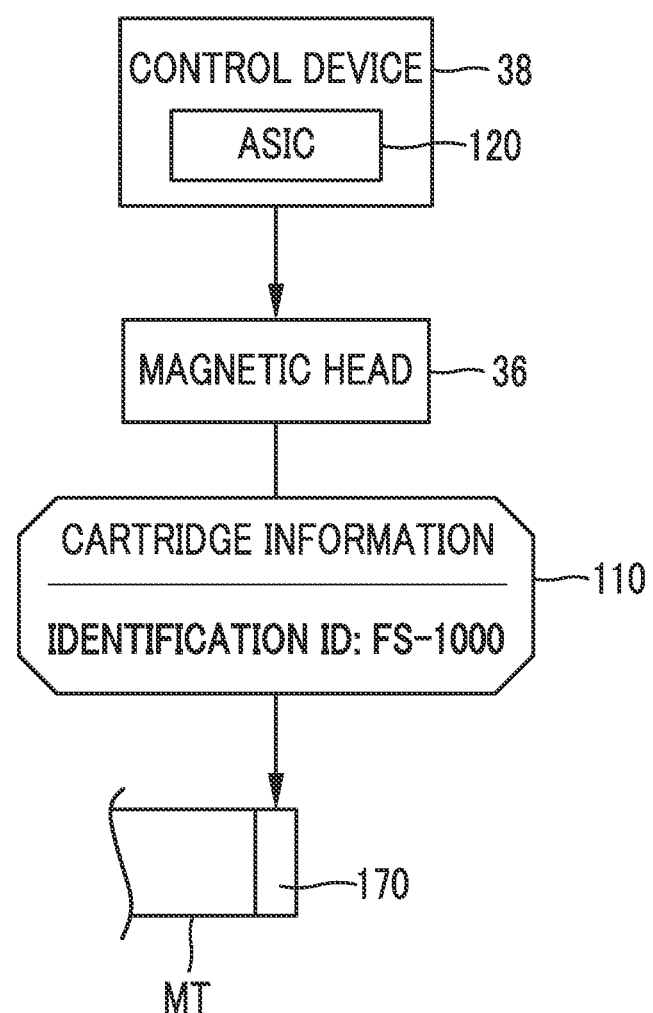
FIG. 30 is a diagram showing an example of an aspect in which the tension allowable range related information is written into a BOT region of the magnetic tape.

As shown in FIG. 30 as an example, at a timing of any one of a case where the magnetic tape cartridge 10 is initially loaded or a case where the magnetic tape MT is initialized, the ASIC 120 (controller 138) of the control device 38 controls the operation of the magnetic head 36 to write the cartridge information 110 into a BOT region 170 provided at the head of the magnetic tape MT. Though not shown, the ASIC 120 controls the operation of the magnetic head 36 to read the cartridge information 110 from the BOT region 170. In this case, the cartridge information 110 is input by a user, for example, through an operation input unit (not shown). The BOT region 170 is an example of a "region of a part of a magnetic tape" according to the technique of the present disclosure.

In this way, in the third embodiment, the BOT region 170 of the magnetic tape MT is used as the storage medium. For this reason, it is possible to save labor to prepare the cartridge memory 19 or to store the cartridge information 110 in the storage block 104A.

The cartridge information 110 may be stored in the BOT region 170 by a magnetic head of a magnetic tape drive disposed in a factory at a timing of any one of a stage in which the magnetic tape cartridge 10 is manufactured, a stage in which the magnetic tape cartridge 10 is inspected, or a stage in which the magnetic tape cartridge 10 is shipped.

Figure 31:
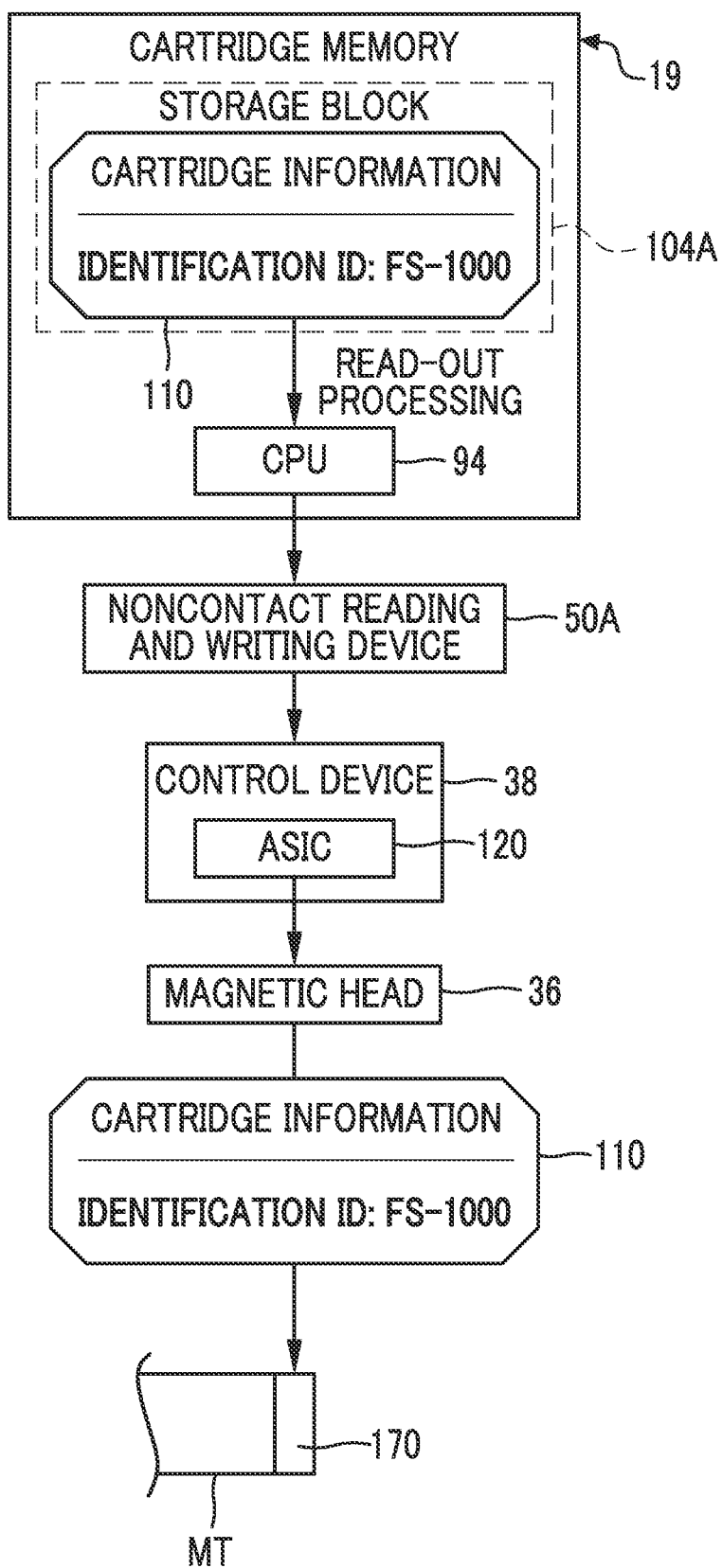
FIG. 31 is a diagram showing another example of an aspect in which the tension allowable range related information is written into the BOT region of the magnetic tape.

As shown in FIG. 31 as an example, an aspect may be made in which the cartridge information 110 read out from the cartridge memory 19 by the noncontact reading and writing device 50A is written into the BOT region 170 by the ASIC 120 (controller 138). In this case, the cartridge information 110 is stored in both the storage block 104A and the BOT region 170. For this reason, it is possible to match the cartridge information 110 stored in the storage block 104A and the cartridge information 110 stored in the BOT region 170, thereby verifying the reliability of the cartridge information 110. Even though a failure occurs in any one of the storage block 104A or the BOT region 170, it is possible to obtain the cartridge information 110 from the other one. Instead of or in addition to the BOT region 170, the cartridge information 110 may be stored in an EOT region (not shown) provided at the tail of the magnetic tape MT. In FIGS. 30 and 31, the date of manufacture of the cartridge information 110 is not shown.

Figure 32:
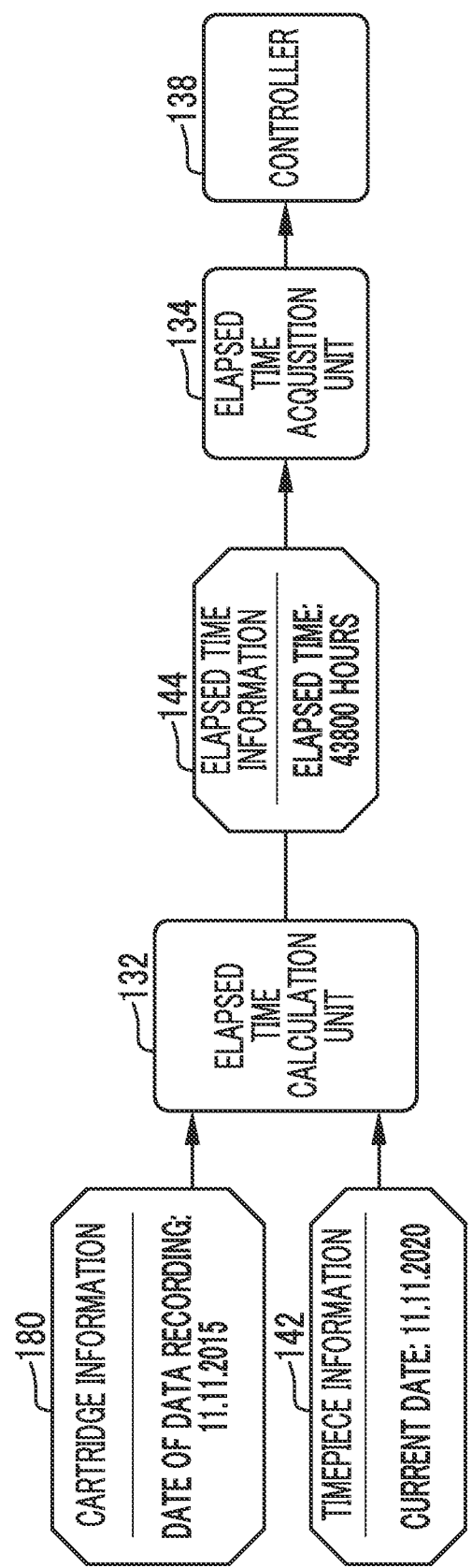
FIG. 32 is a diagram showing an example of acquiring an elapsed time after data is recorded on the magnetic tape.

In the above-described embodiments, although an example where the elapsed time is acquired from the date of manufacture of the magnetic tape cartridge 10 has been described, the technique of the present disclosure is not limited thereto. As shown in FIG. 32 as an example, an elapsed time after the data is recorded on the magnetic tape MT may be acquired.

In FIG. 32, cartridge information 180 including a data recording date as a date on which data is recorded on the magnetic tape MT is used. As in the case of the first embodiment described above, the elapsed time calculation unit 132 calculates an elapsed time from the data recording date based on the data recording date included in the cartridge information 180 and the current date included in the timepiece information 142. The elapsed time calculation unit 132 outputs elapsed time information 144 as information regarding the calculated elapsed time to the elapsed time acquisition unit 134. The elapsed time acquisition unit 134 acquires the elapsed time information 144 from the elapsed time calculation unit 132. The elapsed time acquisition unit 134 outputs the acquired elapsed time information 144 to the controller 138.

In a case where the elapsed time falls below the upper limit of the preservation period, as in the case of FIG. 20, the controller 138 performs control for permitting the use of the magnetic tape MT. In contrast, in a case where the elapsed time is equal to or greater than the upper limit of the preservation period, as in the case of FIG. 21, the controller 138 performs control for prohibiting the use of the magnetic tape MT. The controller 138 displays a warning indicating that the magnetic tape MT is unusable, on the display unit 49.

In this way, control based on the elapsed time after data is recorded on the magnetic tape MT and the upper limit of the preservation period may be performed. Since the usability of the magnetic tape MT is determined depending on a criterion about whether or not recorded data is untroubled, not the life of the magnetic tape cartridge 10 itself, it is possible to more appropriately control the magnetic tape compared to a case where control based on the elapsed time from the date of manufacture of the magnetic tape cartridge 10 is performed.

Figure 33:
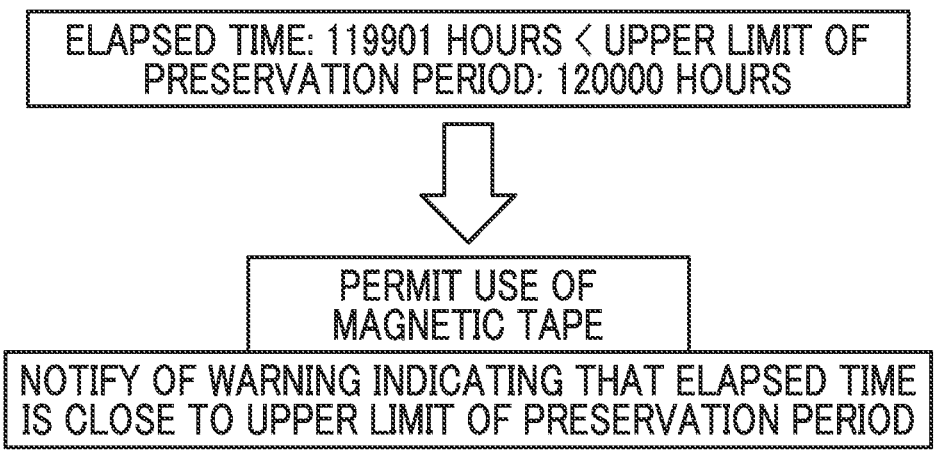
FIG. 33 is a diagram showing an example of control in a case where the elapsed time is close to the upper limit of the preservation period.
Figure 34:
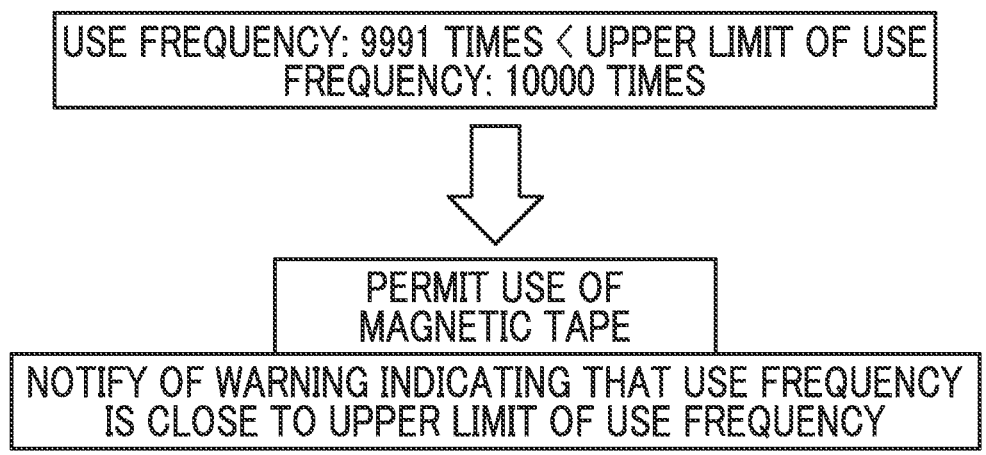
FIG. 34 is a diagram showing an example of control in a case where the previous use frequency of the magnetic tape is close to the upper limit of the use frequency.

As shown in FIG. 33 as an example, in a case where the elapsed time is close to the upper limit of the preservation period, such as a case where 100 hours are left until the elapsed time reaches the upper limit of the preservation period, the controller 138 may permit the use of the magnetic tape MT and may display a warning indicating that the elapsed time is close to the upper limit of the preservation period, on the display unit 49. As shown in FIG. 34 as an example, in a case where the previous use frequency of the magnetic tape MT is close to the upper limit of the use frequency, such as a case where ten times are left until the previous use frequency of the magnetic tape MT reaches the upper limit of the use frequency, the controller 138 may permit the use of the magnetic tape MT and may display a warning indicating that the previous use frequency of the magnetic tape MT is close to the upper limit of the use frequency, on the display unit 49. Then, it is possible to allow the user to know that the life of the magnetic tape MT is impending and to take measures, such as displacing data to the magnetic tape MT of the new magnetic tape cartridge 10.

The technique of the present disclosure is not limited to the illustrated aspect where the cartridge memory 19 is incorporated in the case 12. The cartridge memory 19 may be attached to the external surface of the case 12.

The first to fourth identification information are not limited to the illustrated identification ID. A product name itself of the magnetic tape cartridge 10 may be employed as identification information. The storage medium is not limited to the illustrated NVM 96 of the cartridge memory 19 and the BOT region 170 of the magnetic tape MT. For example, a two-dimensional barcode may be used as a storage medium.

In the above-described embodiments, although an aspect where the temperature/humidity allowable range related information, the preservation period upper limit related information, and the use frequency upper limit related information are stored in the storage medium has been illustrated, the technique of the present disclosure is not limited thereto. At least one of the temperature/humidity allowable range related information, the preservation period upper limit related information, or the use frequency upper limit related information should be stored in the storage medium.

In the above-described embodiments, although both of control for prohibiting the use of the magnetic tape MT and control for notifying of a warning indicating that the magnetic tape MT is unusable are performed, the technique of the present disclosure is not limited thereto. At least one of control for prohibiting the use of the magnetic tape MT or control for notifying of a warning indicating that the magnetic tape MT is unusable should be performed.

As the hardware resource executing the processing of the control device 38, various processors described below can be used. Examples of the processors include a CPU that is a general-purpose processor executing software, that is, a program to function as a hardware resource executing the processing. Furthermore, examples of the processors include a dedicated electric circuit that is a processor having a circuit configuration dedicatedly designed for executing specific processing, such as an FPGA, a PLD, or the illustrated ASIC 120. A memory is incorporated or connected to any processor and any processor executes the processing using the memory.

The hardware resource executing the processing of the control device 38 may be configured of one of various processors or may be configured of a combination of two or more processors (for example, a combination of a plurality of FPGAs or a combination of a CPU and an FPGA) of the same type or different types. The hardware resource executing the processing of the control device 38 may be one processor.

As an example where the hardware resource is configured of one processor, first, there is a form in which one processor is configured of a combination of one or more CPUs and software, and the processor functions as the hardware resource executing the communication retry processing. Second, as represented by SoC or the like, there is a form in which a processor that realizes the function of the entire system including a plurality of hardware resources executing the processing with one IC chip is used. In this way, the processing of the control device 38 is realized using one or more of various processors as the hardware resource.

In addition, as the hardware structures of various processors, more specifically, an electric circuit into which circuit elements, such as semiconductor elements, are combined can be used. The processing of the control device 38 described above is merely an example. Accordingly, it is needless to say that unnecessary steps may be deleted, new steps may be added, or a processing order may be changed without departing from the gist.

Similarly, in regard to the cartridge memory 19, instead of or in addition to the illustrated CPU 94, a dedicated electric circuit that is a processor having a circuit configuration dedicatedly designed for executing specific processing, such as an FPGA, a PLD, or an ASIC, may be used.

The technique of the present disclosure can also be appropriately combined with various embodiments and/or various modification examples described above. The technique of the present disclosure is not limited to the above-described embodiments, and various configurations can be of course employed without departing from the spirit and scope of the technique of the present disclosure. In addition to the program, the technique of the present disclosure extends to a storage medium that stores the program in a non-transitory manner. The content of the above description and the content of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

What is claimed is:
1. A magnetic tape cartridge comprising:
a case in which a magnetic tape is housed; and
a storage medium provided at the case,
wherein the storage medium stores limit data that is at least one of:
temperature/humidity allowable range related information regarding an allowable range of temperature/ humidity when recording on the magnetic tape, reading from the magnetic tape, or any combination thereof, during future use, preservation period upper limit related information regarding an upper limit of a preservation period for future use of the magnetic tape, or use frequency upper limit related information regarding an upper limit of a frequency of recording on, reading from, or a combination thereof, in future use of the magnetic tape, wherein the limit data stored at the storage medium is stored in a storage block that is locked such that it is not rewritable immediately after the limit data is recorded.

2. The magnetic tape cartridge of claim 1, wherein:
the temperature/humidity allowable range related information is a numerical value that represents the allowable range of the temperature/humidity, or is first identification information that corresponds to the numerical value that represents the allowable range of the temperature/humidity.

3. The magnetic tape cartridge of claim 1, wherein:
the preservation period upper limit related information is a numerical value that represents the upper limit of the preservation period, or is second identification information that corresponds to the numerical value that represents the upper limit of the preservation period.

4. The magnetic tape cartridge of claim 1, wherein:
the use frequency upper limit related information is a numerical value that represents the upper limit of the use frequency or is third identification information that corresponds to the numerical value that represents the upper limit of the use frequency.

5. The magnetic tape cartridge of claim 1, wherein:
the storage medium includes an internal memory incorporated in a noncontact communication medium where reading and writing of information are configured to be performed by a noncontact reading and writing device.

6. The magnetic tape cartridge of claim 5, wherein:
the storage block is in the internal memory.

7. The magnetic tape cartridge of claim 1, wherein:
the storage medium includes a region of a part of the magnetic tape.

8. The magnetic tape cartridge of claim 1, wherein:
the limit data also includes tension allowable range related information regarding an allowable range of tension to be applied to the magnetic tape.

9. The magnetic tape cartridge of claim 8, wherein:
the tension allowable range related information is a numerical value that represents the allowable range of tension, or is fourth identification information that corresponds to the numerical value that represents the allowable range of tension.

* * * * *